United States Patent [19]
Linquist et al.

[11] Patent Number: 5,361,399
[45] Date of Patent: Nov. 1, 1994

[54] ADAPTIVE COMMUNICATION SYSTEM FOR TRANSMITTING BETWEEN BASE STATIONS AND PORTABLE TRANSCEIVERS VIA DIFFERENT DATA RATE COMMUNICATION LINKS

[75] Inventors: Roger D. Linquist; Malcolm M. Lorang, both of Dallas, Tex.

[73] Assignee: Pagemart, Inc., Dallas, Tex.

[21] Appl. No.: 892,194

[22] Filed: Jun. 2, 1992

[51] Int. Cl.⁵ .............................................. H04B 7/26
[52] U.S. Cl. ............................ 455/56.1; 455/33.1; 455/54.1; 379/59
[58] Field of Search ............... 455/33.1, 33.4, 51.1, 455/51.2, 54.1, 54.2, 56.1; 379/59, 60, 63

[56] References Cited

U.S. PATENT DOCUMENTS

| | | | |
|---|---|---|---|
| H610 | 3/1989 | Focarile et al. | 379/60 |
| 4,398,192 | 8/1983 | Moore et al. | 340/825.44 |
| 4,670,905 | 6/1987 | Sandvos et al. | 455/33.4 |
| 4,747,120 | 5/1988 | Foley . | |
| 4,747,122 | 5/1988 | Bhagat et al. | 379/57 |
| 4,811,376 | 3/1989 | Davis et al. | 379/57 |
| 4,829,554 | 5/1989 | Barnes et al. | 379/58 |
| 4,918,437 | 4/1990 | Jasinski et al. | 340/825.44 |
| 4,943,803 | 7/1990 | Vrijkorte | 340/825.49 |
| 4,968,966 | 11/1990 | Jasinski et al. | 455/33.4 |

FOREIGN PATENT DOCUMENTS

| | | |
|---|---|---|
| EP0167458 | 8/1986 | European Pat. Off. . |
| 0201126 A2 | 12/1986 | Germany . |
| WO91/13509 | 9/1951 | WIPO . |
| WO84/00868 | 3/1984 | WIPO . |
| WO85/05240 | 11/1985 | WIPO . |
| WO90/04314 | 4/1990 | WIPO . |

OTHER PUBLICATIONS

Ritter, Stephen and McCoy, Jan, "Automatic Vehicle Location–An Overview" in *IEEE Transactions on Vehicular Technology*, vol. VT–26, No. 1, Feb. 1977, pp. 7–11.

Kihara, M., "Performance Aspects of Reference Clock Distribution for Evolving Digital Networks", *IEEE Communications Magazine*, Apr. 1989.

"Unwanted Calls? Turn on Pager Phone", *USA Today*, Dec. 28, 1990, p. 8B.

C. Cox, "Universal Digital Portable Radio Communications", *Proc. of the IEEE*, vol. 75, No. 4, Apr. 1987, pp. 436–477.

Gardner, W. A. and Chen, C. K., "Interference-Tolerant Time–Difference of Arrival Estimation for Modulated Signals", *IEEE Trans. on Acous., Speech, and Sig. Proc.*, vol. 36, No.9, Sep. 1988, pp. 1385–1395.

*Telocator Bulletin, News and Analysis for the Mobile Communications Industry*, vol. 91, No. 3, Jun. 25, 1991.

*Primary Examiner*—Edward F. Urban
*Assistant Examiner*—Chi Pham
*Attorney, Agent, or Firm*—Ross, Howison, Clapp & Korn, L.L.P.

[57] ABSTRACT

A data communication system is provided for generating information at a source (12) and transmitting it to a non-fixed subscriber transceiver unit (STU) (14). The information is first transmitted through a public telephone network (10) to a master station (13) when the master station (13) is operable to assemble a message containing the receiver identification number (RIN) and the source identification number (SIN) along with message information. This is broadcast to geographic stations that each have a defined RF locale. Each of the geographic stations then transmits this message to the STU (14) along with specific information as to what type of RF links are available. Each of the geographic stations has a plurality of channels associated therewith that differ. The STU (14) then transmits back to the geographic station in accordance with the parameters thereof. The geographic station then establishes a communication link with the STU (14) and requests data from the master station (13), which data is then transferred to the geographic station for buffering and subsequent transfer to the STU (14).

26 Claims, 12 Drawing Sheets

5,361,399

ADAPTIVE COMMUNICATION SYSTEM FOR TRANSMITTING BETWEEN BASE STATIONS AND PORTABLE TRANSCEIVERS VIA DIFFERENT DATA RATE COMMUNICATION LINKS

TECHNICAL FIELD OF THE INVENTION

The present invention pertains in general to a communication system, and more particularly, to a data communication system providing simulcast radio frequency channels over which to poll a plurality of remote wireless systems to allow location thereof, and a second system for establishing a direct communication link with the remote systems after location thereof.

CROSS REFERENCE TO RELATED APPLICATION

This application is related to U.S. patent application Ser. No. 661,079, entitled "Personal Location Pager System" and U.S. patent application Ser. No. 661,078, entitled "Adaptive Cellular Paging System", both filed Feb. 25, 1991.

BACKGROUND OF THE INVENTION

The portion of the data communication field that is concerned with establishing a data link with a mobile transceiver is generally concerned with either wireless data links or cellular data links. Additionally, simulcast systems have been utilized to establish for such data links, as disclosed in U.S. Pat. No. 4,968,966, issued Nov. 6, 1990, and U.S. Pat. No. 4,918,437, issued Apr. 17, 1990. Additionally, another system that has been utilized to allow data transfer to a non-stationary location is the CT2 systems. A yet further system for transmitting data to a non-stationary location is disclosed in U.S. Pat. application Ser. No. 661,078, entitled "Adaptive Cellular Paging System", filed Feb. 25, 1991.

In cellular communication systems, the non-stationary transceiver is allowed to roam among a plurality of transmitter locations. The transceiver in the non-stationary location is tuneable to one of a plurality of frequencies such that when the transmission is weak in one transmission location or "cell", the transceiver can establish communication with a transmitter in another cell and "hand off" the communication. This type of system is typically utilized for voice communication, but digital FAX communications can be effected over these data links. In the cellular communication system, the non-stationary transceiver is always in communication with one of the cells. As soon as the transceiver at the non-stationary location is turned on, it establishes a connection with adjacent ones of the transmitters in adjacent ones of the cells on one or more separate control channels. When data is to be transferred to the non-stationary transceiver, the overall system determines which transmitter is to be the RF link closest to the non-stationary transceiver and then instructs the non-stationary transceiver to tune to a receiving channel and a transmitting channel and then the data link is effected. These systems tend to be rather complex.

In another type of system, that disclosed in U.S. Pat. No. 4,968,966, a plurality of cells are defined, each with a paging transmitter associated therewith. Each of the paging transmitters associated with the cells is operable to receive a simulcast transmission in the form of a location request have an address associated with a particular non-stationary location. This non-stationary location is typically in the form of a paging receiver. The paging transmitters then transmit this information out at the same time and the paging receiver will receive the information from the one of the paging transmitters having the strongest signal. The paging transmitter then acknowledges the receipt of this request by transmitting back to the paging transmitters and an associated receiver an acknowledgement signal. Thereafter, data can be transmitted to the paging transmitter that received the acknowledgement signal for retransmission to the paging receiver. Of course, this is typically a one-way transmission.

In the CT2 system, various base stations are disposed around a given location, each base station having the ability to establish and maintain a communication link with a portable transceiver. The base station is connected through the public telephone network to a master station. Typically, the base station can independently validate whether a call coming from a remote transceiver is acceptable as a subscriber, and then establish a telephone link over the public telephone network. However, one disadvantage to this type of system is that it is difficult to call a remote transceiver, as location of the remote transceiver is not known relative to the location of the base stations.

SUMMARY OF THE INVENTION

The present invention disclosed and claimed herein comprises a communication system having a plurality of base stations, each have a fixed location. Each of the base stations has a unique set of RF communication parameters associated therewith and also a common RF polling channel. The base station is operable to generate a request associated with a communication device that has a non-fixed location relative to the base stations. The request contains information regarding the identification number of the communication device and also information about the type of communication link to be established. The communication device is operable to receive from the polling channel the request and, in response thereto, establish a communication link with one of the base stations from in accordance with the unique RF communication parameters of that base station. Information is then transmitted from the base station with which the communication link was established for receipt by the communication device.

In another aspect of the present invention, data is stored at the base station and the request contains information about the message and the transmission systems available to the communication system. Both the communication device and the base station are operable to transmit on high data rate and low data rate channels, with the message information in the request indicating what type of channel over which the data is to be transmitted. Upon receiving the request, the communication device is operable to establish a communication link with the base station on one of the high defined data rate or low data rate communication channels.

In a yet another aspect of the present invention, each of the base stations is operable to have associated therewith a predetermined RF range over which signals transmitted thereby can be received. The unique RF communication parameters are comprised of a group of RF channels associated with that base station, which are a subset of a master group of RF communication channels. Adjacent ones of the base stations have associated therewith RF ranges that overlap, wherein the groups of RF channels associated with the adjacent base stations with overlapping RF ranges are different.

In a further aspect of the present invention, each of the base stations has associated therewith smaller sub-base stations that are operable to transmit on high data rate RF channels and which have RF ranges that are smaller than the RF range of the associated base station but included in the RF range thereof. Upon receipt of a message by the communication device, indicating that data is to be received at a high data rate, the communication device attempts to initiate a communication link with the sub-base station. In the event that the communication device cannot initiate a communication link with the sub-base station at the high data rate due to not being located in the RF range thereof, the communication device thereof will establish a communication link with the base station in whose RF range it is located.

In a yet further aspect of the present invention, a master station is provided for generating a basic request that includes the unique identification number of the communication device. Information to be transferred to the communication device is stored at the master station and then the basic request is transmitted to all of the base stations from the master station. The base stations then retransmit the basic request with the addition of the associated unique RF communication parameters when a communication link is established between one of the base stations and the communication device. A communication link is then established between that base station and the master station and data transmitted from the master station to the base station for storage thereof and retransmission over the communication link to the communication device.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
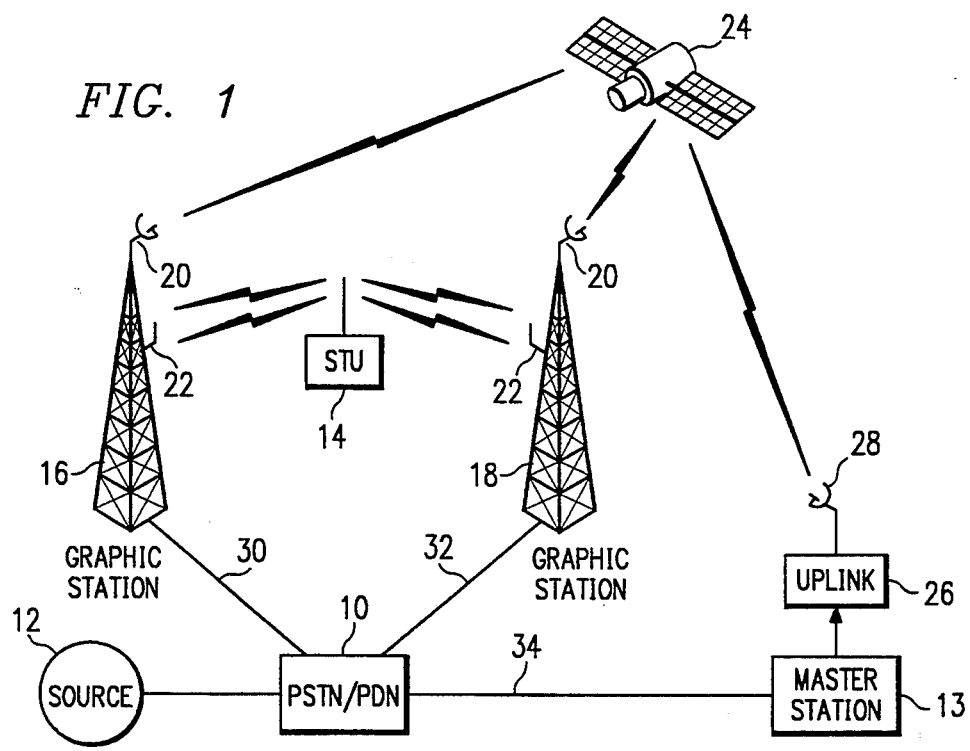
FIG. 1 illustrates a block diagram of the system of the present invention.

Referring now to FIG. 1, there is illustrated a block diagram of the overall system of the present invention. The system generally communicates through a public switched telephone network (PSTN) or public data network (PDN) 10. The PSTN/PDN 10 allows information to be transmitted from a source 12 to a master station 13, the master station 13 operable to contain storage facilities to store data received from the source in the form of voice mail, messages, a telephone switch for two-way voice communications, etc., and also contain a controller for the overall system. The source 12 can either be a source of data to be transmitted to an end user or it can be a normal telephone unit desiring to contact or communicate with an end user over a two way voice channel. The end users have associated therewith a subscriber telephone unit (STU) 14, only one of which is illustrated. The STU 14 is disposed such that it has no particular location but can roam within the transmission ranges of a plurality of geographic stations, each of which has associated at the center thereof a "stick", having transmitting antennas and receiving antennas associated therewith, two sticks 16 and 18 illustrated. Each of the sticks 16 and 18 have associated therewith a satellite receiver dish 20 and a transmit/receive antenna 22. The master station 13 is operable to communicate with the satellite receiver dishes 20 through a satellite 24 that receives data from an uplink 26 and a satellite dish 28. The uplink 26 receives data from the master station 13, which is then transmitted up to the satellite 24 through the dish 28. The satellite 24 is then operable to transmit the information to the satellite receiver dishes 20 in a simulcast manner. Such a transmission method is described in U.S. patent application Ser. No. 612,064, filed Nov. 13, 1990, and entitled "Satellite Control Link".

The information that is transmitted via the satellite 24 is basically request information requesting the STU 14 to provide location information as to which of the geographic stations associated with sticks 16 and 18 provides the optimum RF transmission characteristics. The STU 14 determines which station provides the optimum RF transmission characteristics by the level of RF energy received during the transmission of the location request, the highest RF energy being determined as originating from the optimum one of the sticks 16 and 18. The information transmitted via the satellite 24 consists of a Sender Identification Number (SIN) and a Recipient's Identification Number (RIN) and the message's length and message sequence number sent to recipient. This information is sent out to all of the STUs 14 in the system associated with any of the geographic stations and their associated sticks in the system. However, each of the sticks 16 has a geographic station associated therewith, the geographic station having predetermined communication channels associated therewith. After receipt of the request message from the satellite 24, this request message is then transmitted out on the antenna 22 through a paging transmitter along with the RIN, SIN, message length and, additionally, available channel information associated with each of the sticks. This information is sent out on a polling channel to which each of the STUs 14 is tuned. Only the one of the plurality of STUs 14 that is associated with the transmitted RIN will recognize the message.

Once one of the STUs 14 has recognized its RIN, it will then tune its transmitter to one of the channels indicated as being available on the stick from which it received the polling request. The geographic station at the stick will then acknowledge that the STU 14 has in fact seized that channel and a communication link is then set. The geographic station will then communicate with the PSTN/PDN through a telephone link, there being a telephone link 30 associated with the stick 16 and a telephone link 32 associated with the stick 18. The master station 13 communicates with the PSTN/PDN 10 through a telephone line 34. The master station 13 will then download data through the PSTN/PDN 10 to the requesting one of the geographic stations at sticks 16 or 18. The data will then be buffered at the geographic station and subsequently transferred to the STU 14. ARQ is used for flow and error control with the geographic cell. After the data has been transferred to the STU 14, the end of transmission (EOT) acknowledgement signal is sent back to the geographic station and then this EOT code is sent back to the master station 13 from the geographic station. Also, the optional acknowledgement signal may be sent to the sender. However, the overall communication link could be a voice link wherein the source 12 was a telephone. The master station 13 would then merely control the system to make a connection, either through the PSTN/PDN 10 or through a switch in the master station 13 to allow a voice connection to be made between the source 12 and the STU 14. Whenever an "on-hook" condition was detected by the STU 14, the STU 14 would then transmit an end of transmission code back to the geographic stations, which would then transmit the same back to the master station 13.

In one example of the present system, the source 12 would initially generate the SIN and RIN and construct a message, the message being voice mail, a simple message, or text graphics contained in a computer database. This also could be E-mail. The source 12 then connects through the PSTN/PDN 10 with the master station 13 over the telephone line 34. The master station 13 then sends a location request through the satellite 24 to each of the paging receiver dishes of the sticks 16 and 18. This information is then collected and transmitted out to the STU 14 from the antennas 22 with associated channel information indicating the channels that are associated with sticks 16 and 18. The STU 14 will receive messages from only one of the sticks 16 or 18, the one with the strongest signal. If the stick 16 has the strongest signal, the STU 14 would receive as part of the location re-quest information as to channels allocated to that stick. The STU 14 would then search for an open channel and transmits a channel request word with its RIN and the disposition of the message, if it is not an interactive message, i.e., it would request receipt of the message. This is received by the geographic station at stick 16 and then the geographic station at stick 16 would transmit acceptance of the STU 14 channel request and lock out that channel for use by STU 14. The geographic station at stick 16 would then call back to the master station 13 through the line 30 and line 34 via PSTN/PDN 10 for the message file. The master station 13 would then send the message file to the geographic station at stick 16. The geographic station at stick 16 would then transmit the message to the STU 14 having error detection with automatic repeat request (ARQ) for error control and acknowledgement for flow control, which, upon completion and receipt, would result in the STU 14 transmitting back an end of transmission code to the geographic station. The geographic station would then transmit an end of transmission code to the master station 13 and the file would be removed.

Although a satellite link 24 was illustrated as transmitting the location request via a simulcast paging link, it should be understood that each of the sticks 16 and associated geographic stations could receive the request through the telephone lines. In this manner, the master station 13 would make a connection with each of the geographic stations on a separate phone line for use with the polling information and transmit the polling information thereto, which would then be transmitted via the antennas 22. In this mode, however, synchronization or a time standard would be required at each station in order to ensure that all of the messages were transmitted out at substantially the same time. GPS, TDRS, OMEGA, LORAN-C and NBS receivers are RF sources plus NBS over the PSTN, or alternative time standards.

Figure 2:
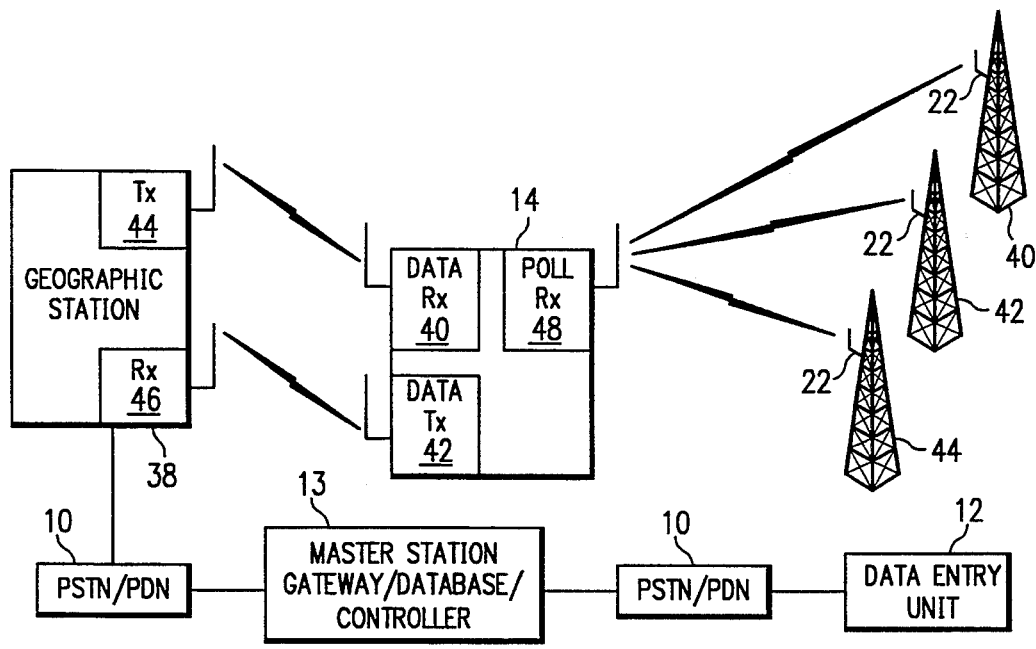
FIG. 2 illustrates a more-detailed block diagram of the portable transceiver.

Referring now to FIG. 2, there is illustrated a block diagram of the geographic station and the STU 14, the geographic station denoted by a reference numeral 38. Three sticks 40, 42 and 44 are illustrated as being separate from the geographic station 38. However, in the preferred embodiment, each of the sticks 40-44 in the system will have a geographic station similar to the geographic station 38 associated therewith. For simplification purposes, the geographic station 38 is illustrated as being separate from the sticks 40-44. However, some of the geographic stations 38 can be separate, as will be described hereinbelow.

The geographic station 38 and STU 14 are generally comprised of the electronics that are utilized in the CT2 and paging systems that are manufactured by Motorola. The geographic station 38 can either be one or more modified CT2 systems that are manufactured under the "SILVERLINK II" tradename or the personal base station manufactured under the "SILVERLINK 2010 and 2020" tradenames. The STU 14 embodies the modified electronics of the "SILVERLINK 2000" personal telephone manufactured by Motorola. The CT2 telephone system in accordance with the CAIMPT 1375 standard, which standard provides for up to forty channels with the base station or the portable product dynamically selecting the clearest channel. The frequency band and number of channels are reconfigured to meet regulations, with a channel spacing of 100 kHz and 25 kHz to meet the two modes of communications. Power output is loosed using SMR/paging base station modules, as described in Motorola manual 68P81064E05-B.

The STU 14 is illustrated as having a data receiver 40 and a data transmitter 42 for communicating with the geographic station 38. The geographic station 38 also has a transmitter 44 and a receiver 46. The transmitter 44 communicates with the data receiver 40, whereas the receiver 46 communicates with the data transmitter 42 and the STU 14 through associated antennas. A polling receiver 48 is provided on the STU 14 for communicating with the sticks 40-44. Although three antennas are illustrated for the STU 14, it should be understood that a single antenna will suffice, the operation of which is multiplexed, as will be described in more detail hereinbelow.

The geographic station 38 is interfaced through the PSTN/PDN 10 to the master station 13, which provides the gateway/database/controller operation. Similarly, the master station 13 is connected through the PSTN/PDN 10 to the source 12, which provides access to the data entry unit.

In operation, as described above, the master station generates the location request information that is transmitted to each of the sticks 40–44, indicating that a message is stored at the master station 13. As described above with reference to FIG. 1, each of the sticks also transmits its channel information to the STU 14. The channel information relates to available channels within the RF range of the transmitting stick. This channel information can be either high data rate channels or low data rate channels or both. Further, the actual transceiver that is connected to the STU over the resulting communication link need not be at the location of the polling geographic station; rather, it need only be in the RF range of the geographic station at the stick location. In this way, geographic station 38 need not be disposed at the same location as the sticks 40–44, but rather, can be located at a different location. In this mode, the STU 14 would be required to scan the various channels looking for an idle code on one of the channels of the geographic station 38 and then request this channel for connection therewith. The geographic station 38 would then lock out this channel for use by the STU 14 and then request the message or data from the master station 13 for routing to the STU 14.

In one embodiment of the present invention, there are different types of geographic stations, low data rate geographic stations and high data rate geographic stations. The low data rate geographic stations operate at a data rate of 16 kbps requiting a bandwidth of approximately 25 kHz. The high data rate geographic stations operate at a data rate of approximately 72 kbps, requiring a bandwidth of approximately 100 kHz. The high data rate typically utilizes a 32 kbps/32 kbps format for two-way voice or data. The polling messages would typically be sent on the lower data rate links, whereas data would typically be transmitted on the high data rate channels. Therefore, the geographic stations at the sticks 40–44 might generate the location request on the low data rate channels whereas a geographic station not located at the sticks 40–44 would transmit on the high data rate channels. Of course, the transmission patterns for the two data rate channels will be different, as will be described hereinbelow.

Figure 3:
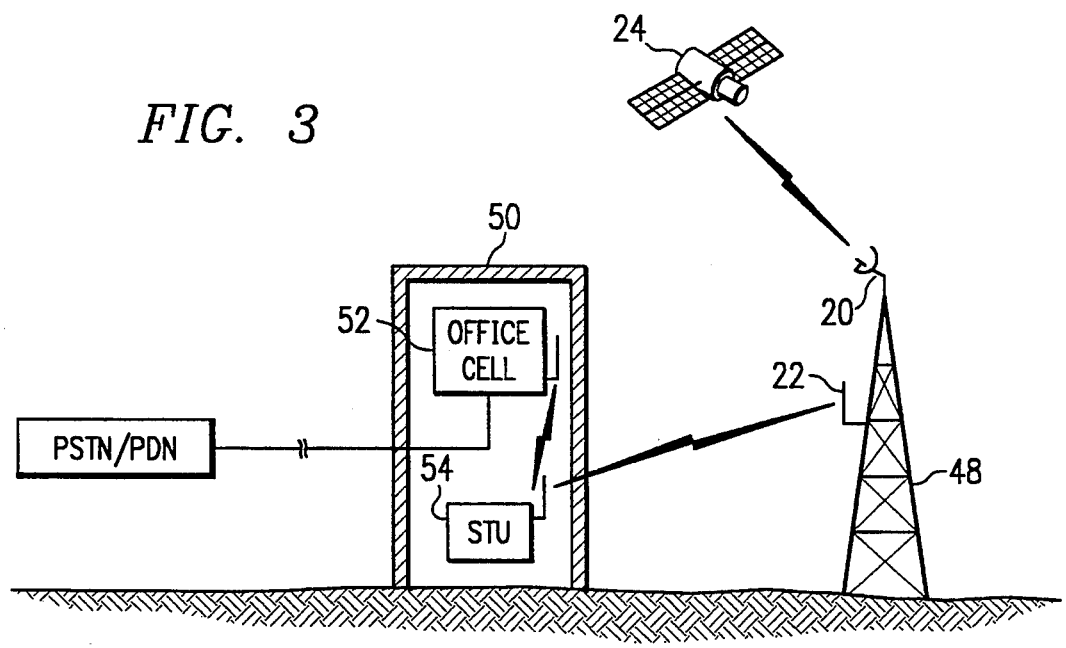
FIG. 3 illustrates a block diagram of the office cell.

Referring now to FIG. 3, there is illustrated an embodiment of one of the geographic stations that is separate from the stick that is operable to receive the location request information in the form of a page from the satellite 24. A stick 48 is illustrated that is disposed adjacent a building 50. The building has disposed therein an office cell 52, which is a specialized geographic station that operates on a private or non-public group of channels. Therefore, each of the office cells 52 has associated therewith a particular group of channels that is different from the channels of overlapping geographic stations. In operation, a STU 54 is provided that is within the transmit/receive range of the office cell 52, the office cell 52 typically operating on a high data rate. When the location request message is transmitted to the stick 48, the transmitter associated with the stick 48 is then operable to transmit a location request from the antenna 22 to the STU 54 on the polling channel. The information transmitted in this message is at a minimum the RIN, SIN and channel information. If the STU 54 is in a private mode, it would seek out only the high data rate channels of the office cell 52. If in a normal mode, it would first seek out a high data rate channel on the office cell and, if not available, then the high data rate channels given by the channel information of the geographic station would be scanned. If no high data rate channels were available, the STU 54 would scan the available low data rate channels of the geographic station associated with the stick 48. In any event, the STU 54 can communicate with the office cell 52 by scanning the available channels associated therewith. Typically, these would be all of the channels available to a CT2 phone, with the exception of the available channels of the geographic station associated with the stick 48. The office cell 52 would then operate in accordance with the above-described description and communicate through the PSTN/PDN 10 with the master station 13.

Figure 4:
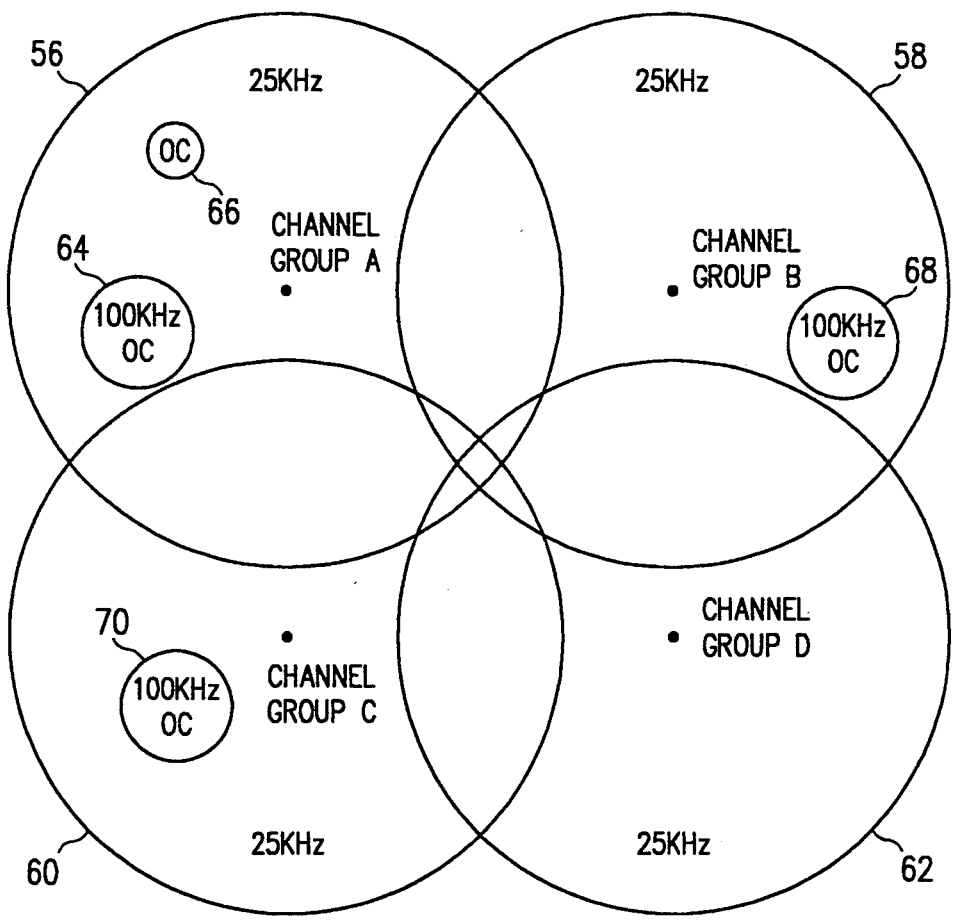
FIG. 4 illustrates a diagrammatic view of four cells having office cells disposed therein.

Referring now to FIG. 4, there is illustrated a diagrammatic view of four cells defined by four separate RF patterns 56, 58, 60 and 62. Each of the RF patterns 56–62 represent the receiving range from a transmitter located at the center thereof over which one of the STUs 14 would adequately receive sufficient signal to extract data therefrom. This type of pattern is to be distinguished from that associated with a CT2 telephony operation, in that CT2 operation typically requires completely separate regions, such that each of the CT2 geographic or base stations associated with each region can receive and transmit on all of the associated channels. If any of the transmitting/receiving ranges would overlap, this could result in some ambiguity existing with a remote CT2 telephone operation in that a transmission on a given channel would be received by two base stations.

In accordance with the present invention, overlapping RF patterns have associated therewith distinct channel groups. In the embodiment illustrated in FIG. 4, there are four channel groups A, B, C and D. RF pattern 56 has channel group A associated therewith, RF pattern 58 has channel group B associated therewith, RF pattern 60 has channel group C associated therewith and RF pattern 62 has channel group D associated therewith. Each of the channel groups is different such that any transmission on one of the channels in channel group A would not interfere with any transmissions in any of the other RF patterns 58–62.

Within each of the RF patterns 56, there can be located one or more office cells 52, each having an RF pattern associated therewith. For example, in RF pattern 56, there are two office cells 64 and 66 associated therewith, one office cell 68 associated with RF pattern 58 and one office cell pattern 70 associated with RF pattern 60. It can be seen that the RF patterns of the office cells are smaller than the associated RF patterns 56–62. This is due to the fact that the RF patterns 56–62 are associated with high power low data rate transmissions and the transmission associated with the office cell pattern 64–70 are at a low power and higher data rate. Therefore, the office cell pattern 66 of the associated office cell could utilize a channel group that included all channels with the exception of the channels in channel group A, since the RF pattern 66 for that office cell does not overlap any of the other RF patterns 58, 60 or 62. In this manner, the polling channel would cover the entire RF pattern 56 whereas the STU 14, if it were located in the RF pattern 66, would then communicate with the office cell associated with the RF pattern 66 and operate on a higher data rate channel. This particular configuration would allow for a higher frequency re-usage. Note, the high data rate cells are spatial subsets of the low data rate cells. Also, it should be noted that the cell size is primarily transmission power dependent and the data rate can be altered.

Figure 5:
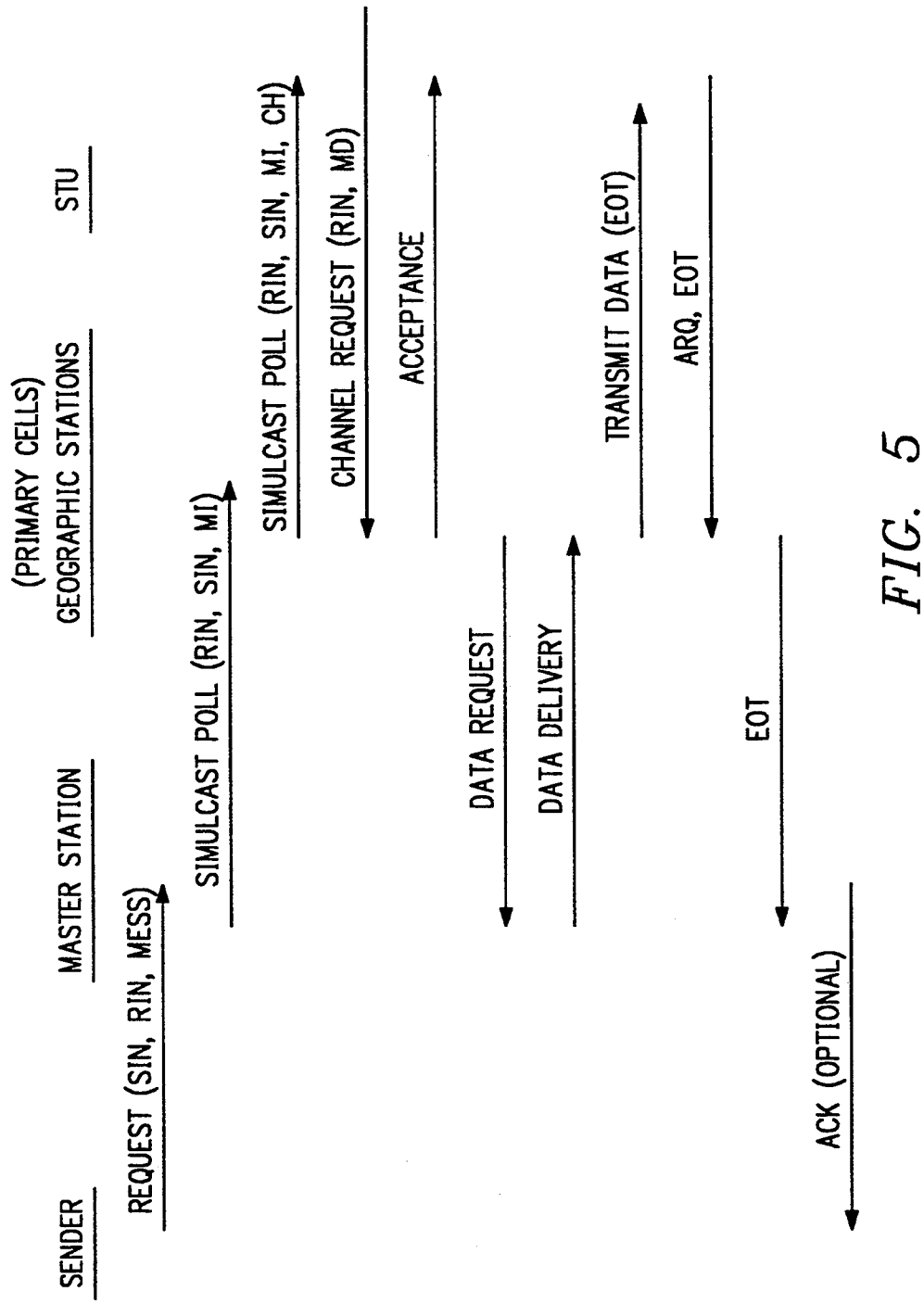
FIG. 5 illustrates a line drawing showing the flow of data and control information for the transmission system of the present invention.

Referring now to FIG. 5, there is illustrated a fine diagram illustrating the sequence of transmissions required to transmit a message to the STU. Initially, a request is generated by constructing a message. This message could be text graphics that could be transmitted via an I/O peripheral to a computer database, it could be a call over a two-way voice link to either generate voice mail and leave a message, or it could be E-mail. In the case of the text/graphic message and E-mail, the RIN would be entered, followed by the SIN and then the message would be sent. The master station gateway would enter/accept the message, this operation involving an authentication step, receipt of the message and then storage of the message. The master station would then generate a simulcast poll that would send a location request constructed of the RIN, the SIN and message information, this message information indicating whether this information is data or a voice link, and the length of the message. The geographic station receives this information and then re-transmits it out of its polling transmitter on the polling channel. The message is reconfigured to add allocated channel information associated with each of the geographic stations generating the location request such that upon receipt of the location request, the STU will know which channels are allocated to a particular geographic station.

Figure 6:
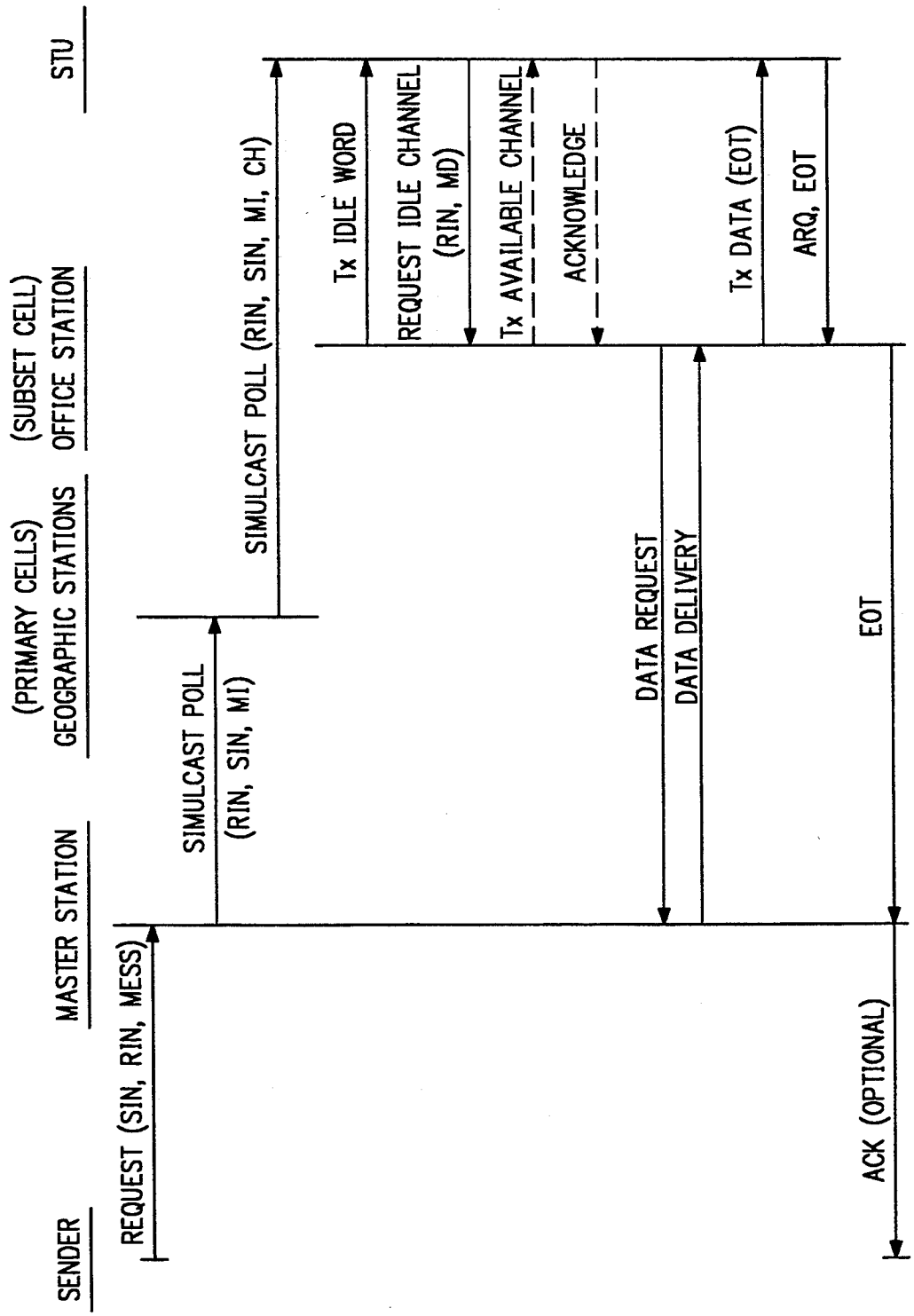
FIG. 6 illustrates a line drawing for an alternate embodiment of the transmission system.

In the embodiment of FIG. 6, the message information contains information as to the type of message sent. If this message is data or voice, the STU will automatically seek out a high speed data link. The channel information from the geographic station contains two basic lists, a first list of the low data rates channels, and a second list of the high data rate channels. As described above, the high data rate channels are typically associated with office cells, and as such, the STU may not be in the range of one of the office cells. Therefore, the STU must first search to see if one of the high data rate channels is available and, if not, then search to see if one of the low data rate channels is available. The low data rate channels are all typically public.

In order to apprise the STU of the presence of a high data rate channel, each of the office cells in the associated transceivers operating at the high data rate transmits an idle word within the CT2 protocol at this high data rate. The STU scans all of the high data rate channels to detect the presence of the idle word. When detected, the STU will then transmit back to the office cell that transmitted the idle word a request for this idle channel. The information that is then transmitted to the office cell or geographic station is the RIN and the message disposition (MD) that indicates to the geographic station what is to be done with the message, i.e., it could be stored for later retrieval, it could be delayed by a predetermined time, or it could be ignored, or it could be sent immediately.

In circumstances where the idle word is received by an STU, and then this request is transmitted to the office cell or geographic station and the channel is no longer available, the office cell or geographic station receiving the request for the idle channel will transmit back to the STU an available channel on which the STU is to transmit. The office cell or geographic station then locks out this channel for use by the STU and then the STU acknowledges on this locked out channel. The data is then requested by the geographic station or office cell from the master station and data delivered thereto. This data is then transmitted to the STU with the last of the data followed by an End of Transmission (EOT). The data is transmitted in packets in accordance with the CT2 protocol or a modified version thereof. Also, Automatic Repeat Request (ARQ) and Forward Error Control (FEC) are used for flow and error control in the RF link. When the STU receives the EOT from the geographic station or office cell, it returns an EOT. The geographic station or office cell then returns an EOT to the master station and back to the master station if so requested.

Figure 7A:
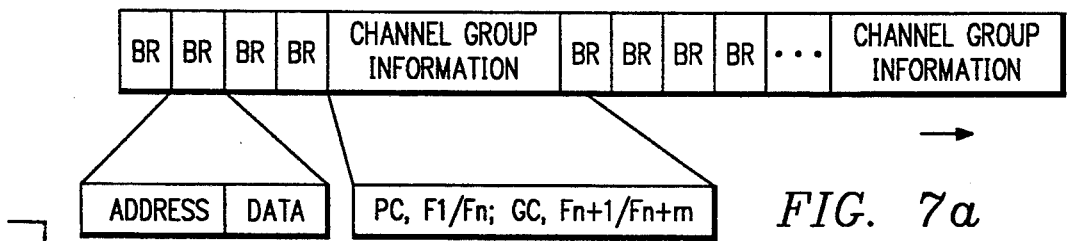
FIG. 7a and 7b illustrate the location request protocol.
Figure 7B:
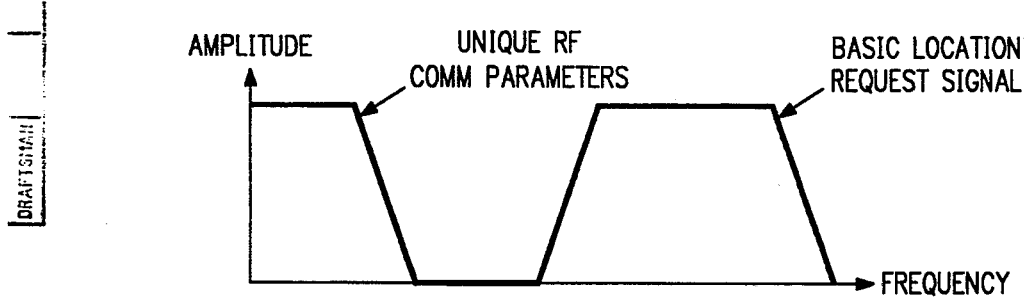

Referring now to FIG. 7a and 7b, there are illustrated the protocol for the basic request notification and command control. In general, the information is transmitted as a series of fields. The large portion of the fields are comprised of basic request fields (BR) which are typically sent out in groups such that multiple requests are sent out in an adjacent relationship. Each of the basic requests is comprised of address and data. The address comprises the address a specific STU 14 and the data is the associated location request disposition, as described above. Periodically, channel group information is transmitted from each of the individual geographic cells. The information that is transmitted is information regarding the private cells (PC) that are associated with a given geographic cell. Further, the channel information indicating the channels from $F_1$ to $F_n$ associated with the private cells associated therewith is transmitted. Following this, the channel information regarding the geographic cell (GC) is transmitted, this frequency information being $F_{n+1}$ to $F_{n+m}$. In this manner, the channel group information only needs to be transmitted periodically such that the STU 14 continually receives channel group information and store this channel group information. This information is not needed until a basic request is received having the unique address of the STU 14. At that time, the STU 14 then attempts to utilize the channel group information that was received previously. Further, the STU 14 can wait to receive the next channel group information transmitted.

FIG. 7b illustrates the frequency domain operation of the STU 14 illustrating that the unique RF communication parameters, i.e., the channel group information, is transmitted at the base ban. The basic location request (BR) is transmitted on a modulated sub-carrier. This provides more efficient usage of the frequency bans of interest, allowing transmission of both the channel group information and the basic requests.

Figure 8:
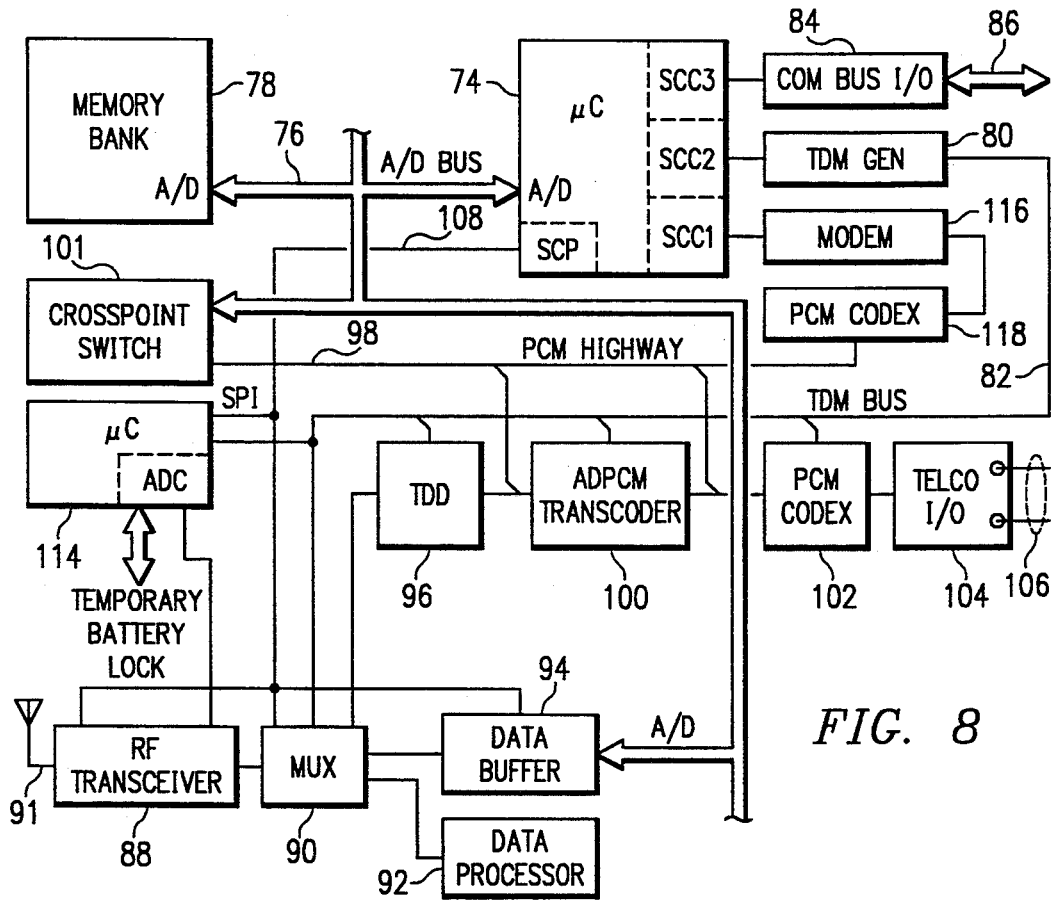
FIG. 8 illustrates a block diagram of the high data rate station.

Referring now to FIG. 8, there is illustrated a block diagram of the geographic station that is associated with each of the sticks. In the preferred embodiment, the geographic station incorporates the circuitry necessary to accommodate both the low data rate channel and the high data rate channel such that it can operate on the low data rate channel in accordance with conventional paging protocols, such as the POCSAG protocol, and also operate on the high data rate channel utilizing the CT2 protocol. The CT2 protocol is conventional, and is described in the specification for the CT2 Common Air Interface, version 1.1, dated Jun. 30, 1991, which is published by ETSI, this document being incorporated herein by reference. The primary structure of the geographical station with respect to the high speed data link is substantially identical to that of the Motorola CT2/CAI personal base station and dedicated two-line telepoint data station, marketed under the trademark "SILVERLINK". A central microcontroller 74 is provided for controlling the general operation of the system. The microcontroller 74 is generally comprised of Part No. 68302 manufactured by Motorola. The microcontroller 74 has a serial control port (SCP) and three serial communication ports (SCC1, SCC2 and SCC3). Address/data control lines (A/D) that interface with an A/D bus 76. The A/D bus 76 is interfaced with a memory bank 78 that is comprised of both volatile and non-volatile memory in the form of RAM and ROM, respectively. A time division multiplex generator 80 is connected to the SCC2 communication port and controls timing through a TDM bus 82. A communication bus input/output circuit 84 is provided for interfacing with an I/O bus 86, and is controlled by the SCC3 communication port of the microcontroller 74.

An RF transceiver 88 is provided that is interfaced with an antenna 91. The RF transceiver 88 is a general transceiver that is utilized in CT2/CAI compatible systems and operates over the band 864.1–868.1 MHz with a channel spacing of 100 kHz. A total of forty channels is accommodated by the transceiver 88 and utilizes time division duplex (TDD) that allows transmission and reception to occur on the same frequency. The transmit/receive period is 1/1 millisecond and the modulation is accomplished with binary FSK. The transceiver 88 accommodates adaptive differential pulse code modulation (ADPCM) at a channel bit rate of 72 KBPS. The data rate stability is approximately 50 PPM with a reference of 72 KBPS, with a speech bit rate of 32 kbps.

The transceiver 88 has the output thereof connected to a multiplexer 90 that is operable to multiplex the operation between low data rate and high data rate. In the low data rate operation, the system operates on a 16 kbps data rate and the output is connected to a data processor 92 and a data buffer 94. The data processor is operable to examine the data output by the multiplexer 90 upon reception, and then placed in the data buffer 94. Additionally, the multiplexer can input the data directly into the data buffer for interface with the A/D bus 76. The general operation of the system is then controlled by the microcontroller 74 to route data therebetween. The data processor 92 is primarily operable to process data at the 16 kbps rate and interface with the POCSAG protocol to extract data therefrom for input to the microcontroller 74.

In the high data rate operation, the multiplexer 90 is interfaced with a TDD circuit 96 which is manufactured by Motorola under Part No. 5105662640. The TDD chip is a time division duplex chip that operates on one millisecond for transmission time and one millisecond for reception time. The output of the TDD chip is connected to a PCM highway bus 98 that is input to a cross point switch 101 to control data that travels on the PCM highway bus 98. The PCM highway bus is input to an ADPCM transcoder chip 100 that is operable to convert the ADPCM output of the TDD chip to PCM data. The output of the TDD chip 96 is therefore routed through the PCM highway bus 98 and cross point switch 101 back to the input of the ADPCM transcoder chip 100. The output of the ADPCM transcoder chip 100 is also connected to the PCM highway bus and routed through the cross point switch 101 back to the input of a PCM codex chip 102. The PCM codex chip is basically a digital-to-analog converter plus Output filter, and an input filter plus analog-to-digital converter, and is manufactured by Motorola under Part No. MC145480. The output of the PCM codex chip CODEX102 is connected to a telephone I/O circuit 104 for interfacing with telephone lines 106 to allow phone line signals to be transferred to or from the telephone lines 106. The configuration of FIG. 7 with respect to the telephone I/O chip 104 utilizes a dedicated line. However, for a non-dedicated line, a modem could be utilized.

Control of a system by the microcontroller 74 is achieved through both the A/D bus 76 and also through a serial control bus 108 to allow generation and routing of the microcontrol signals. The bus 108 is connected to the RF transceiver 88, multiplexer 90, data buffer 94 and also to a second microcontroller 114, as manufactured by Motorola under the Part No. 68SEC11. The microcontroller 114 interfaces with the analog output of the RF transceiver through an analog-to-digital converter (ADC) that is an integral part of the microcontroller 114. The RF transceiver typically will have analog signals that are output thereby indicating RF level, etc., and these are monitored by the microcontroller 114 and controls are then placed on the SPI serial port interface bus 108.

The TDM bus 82 is interfaced with the PCM codex chip 182, the ADPCM transcoder chip 100, the TDD chip 96, the microcontroller 114 and the multiplexer 90 to control the operation thereof in accordance with the time division multiplex operation. A modem 116 is provided that is interfaced with the SCC1 serial communication port on the microcontroller 74 and a PCM codex 118 to allow the microcontroller 74 to communicate with the PCM highway 98. In this manner, the microcontroller 74 can receive data directly from the PCM highway 98.

In operation, the multiplexer 90 either selects the data processor 92 path for operation in the low data rate mode or selects the high data rate path for interface with the TDD 96 in the high data rate mode. The RF transceiver 88 is controlled to operate on one of the plurality of channels such that it can transmit polling messages in a low data rate mode and transmit and receive high data rate messages in accordance with the CT2 protocol in the high data rate mode.

Figure 9:
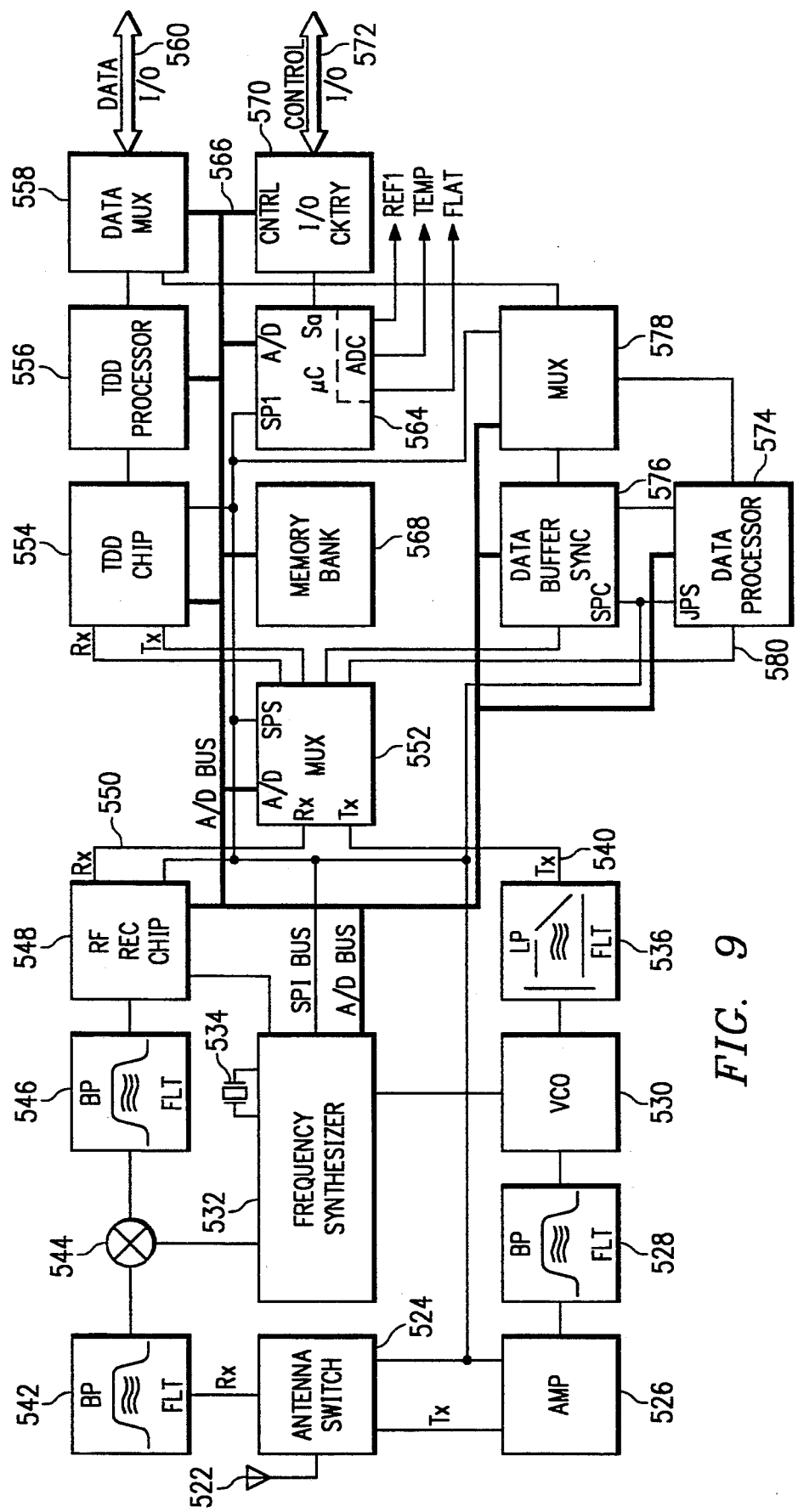
FIG. 9 illustrates a block diagram of the STU.

Referring now to FIG. 9, there is illustrated a block diagram of the STU 14. In general, the STU 14 incorporates the general structure of the CT2/CAI compatible personal telephone manufactured by Motorola under the trademark "SILVERLINK 2000". It generally meets the requirements of MPT1375 and interfaces with CAI compatible public and private based stations. It utilizes a time division duplex technique to provide full duplex communications along a single channel, and is operable to facilitate automatic communications on one of forty radio channels in the 864.1–868.1 MHz band, which will be changed to meet regulations.

An antenna 522 is provided that is connected to the output of an Rx/Tx antenna switch 524. The Tx side of the switch 524 is connected to the output of an amplifier 526 that operates over the band of interest and at two power levels, a low power level of 5–10 milliwatts and a high power level of 100 milliwatts. The low power level is used for high data rate communication and the high power level used for low data rate communication. The input to the amplifier is connected to the amplifier of a band-pass filter 528, which filters the output of a voltage controlled oscillator (VCO) 530. The VCO 530 is controlled by a frequency synthesizer 532 that is controlled by a crystal 534. The frequency synthesizer is tuneable to allow control of the VCO 530 over the band of interest. The modulation input to the VCO is connected to the output of a low-pass filter 536, which receives data on a Tx bus 540.

The Rx output of the antenna switch 524 is connected to the input of a band-pass filter 542 which has a band-pass filter response over the frequency of interest. The output of the filter 542 is connected to the input of a down converter 544, which has the local oscillator input thereof connected to the output of the frequency synthesizer 532. The output of the down converter 544 is connected to the input of an intermediate band-pass filter 546, the output of which is connected to a receiver chip 548, this being a conventional receiver chip used by Motorola and referred to as a ZIF receiver for "Zero IF" receiver. The output of the receiver chip 548 is placed onto an Rx bus 550.

The Tx bus 540 and the Rx bus 550 are connected to a multiplexer 552, such that the multiplexer can, during a receive operation, receive data from the Rx bus 550 and, during a transmit operation, output data to the Tx bus 540. The multiplexer 552 interfaces with either a high data rate section or a low data rate section. The high data rate section is comprised of a TDD chip 554 that is connected to a TDD processor 556 to process the time division duplex data. Typically, this is comprised of the data link layer protocol processor with a bypass for voice. The output of the TDD processor is typically digital data, which is connected to a data multiplex and I/O circuit 558 for interface with a data I/O bus 560. The data I/O bus 560 can also be interfaced with circuitry to allow the data I/O bus to interface with the ADPCM transcoder chip and then the PCM chip, and then interface amplifiers to the speaker and microphone input to allow two-way voice data to be transmitted. The circuit 558 is operable in a multiplex mode to operate on a high data rate or a low data rate and, therefore, has two inputs, one connected to the TDD processor 556 and one connected to the low data rate portion.

A microcontroller 564 is provided that is interfaced with an address/data (A/D) bus 566 that interfaces with the TDD chip 554, the TDD processor 556 and the data multiplexer and I/O circuit 558. Additionally, it interfaces with the multiplexer 552, the RF receiver chip 548 and the frequency synthesizer 532. A memory bank, 568 is provided and is comprised of both volatile and non-volatile memory and is interfaced with the A/D bus 566. A control I/O circuit 570 is also interfaced with the A/D bus 566 and with the microcontroller 564 though a serial control interface and with a parallel control I/O bus 572. The control I/O circuitry is operable to receive external control signals and interface these control signals with the microcontroller 564.

The low data rate portion is comprised of a data processor 574 and a data buffer 576. The data processor is operable to receive data from the multiplexer 552, process the data and input it to a multiplexer 578. The multiplexer 578 is operable during a receive operation to transmit the output of the data processor 574 to the input of the data multiplexer and I/O circuit 558. In another operation, the multiplexer 578 can select the output of the data buffer for connection to the data buffer and I/O circuit 558. In a transmit operation, the data processor 574 implements the majority of the OSI data link layer functions, such as link protocol, for the low data rate data that is directly input to the multiplexer 552 or input to data buffer 576 for input to the multiplexer 552. The data buffer 576 is basically a part of the memory bank 568, but is illustrated as being a separate circuit for simplification purposes. Both the data buffer 576 and data processor 574 are connected to the A/D bus and also to a serial control bus 580. The serial control bus 580 is connected to the serial port interface from the microcontroller 564, which bus is also connected to the TDD chip 554, multiplexers 552 and 578, data buffer 576, data processor 574, receiver 548 and a frequency synthesizer 532. This allows the microcontroller 564 to interact with the various circuitry during the operation thereof.

Figure 10:
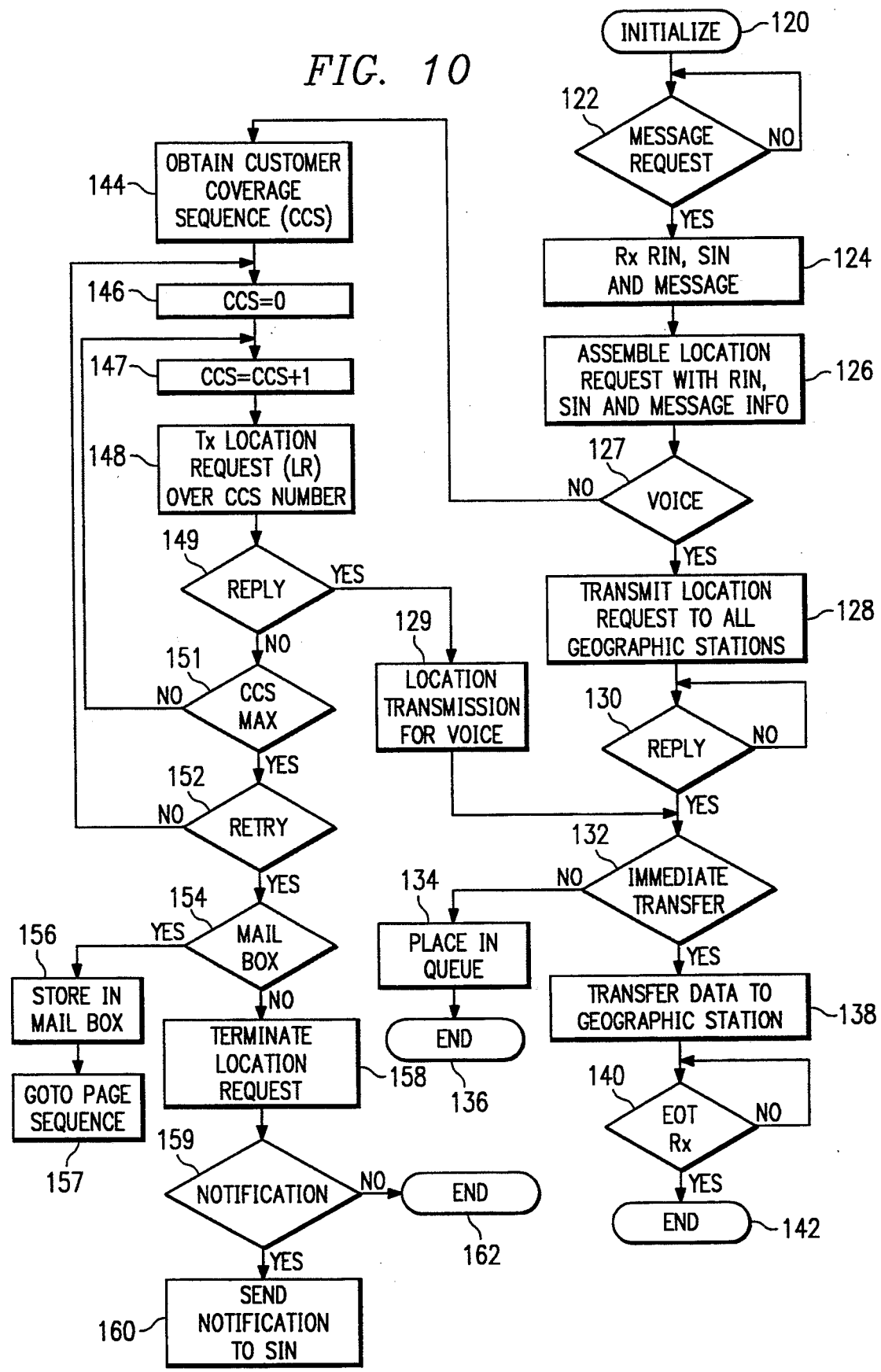
FIG. 10 illustrates a flowchart for the operation of the master station.

Referring now to FIG. 10, there are illustrated a flowchart for the operation of the master station, which is initiated at an initialize block 120. The program then flows to a decision block 122 to await a message request from the source or the data entry point. The program will then flow along a "N" path back to the input thereof until the request is received, at which time, it will flow to a function block 124 along a "Y" path. The function block 124 represents the function wherein the RIN, SIN and the message are received from the data entry point. The program then flows to a function block 126 to assemble the location request with the RIN, SIN and the message information such as the message length, type of message, etc. For example, the message could indicate that this is a two way voice connection, or it could indicate that it is a FAX connection, which should be effected along a 1:1 duplex versus N:1 duplex in the high data rate channel. The program then flows to a decision block 127 to determine if the message information indicates voice transmission. If so, the program flows to a function block 128 wherein the location request is transmitted to all of the geographic stations, either via satellite or via land line, depending upon the system architecture. The program then flows to a decision block 130 to determine if a reply has been received from any of the geographic stations, indicating that the requested STU has been located. This is a reply from the geographic station. The program will flow along an "N" path back to the input until the reply is received, at which time the program will flow to a decision block 132 along a "Y" path.

If the transmission is a voice transmission, the program will flow along the "N" path from decision block 127 to a block 129 that indicates that the location request for transmission voice is to be effected. The program will then flow from the block 129 to the input of the block 132. The decision block 132 determines whether an immediate transfer of the data is requested. As described above, the information received back from the STU also has associated therewith message disposition information. If the STU requests that the information be requested at a later time, this can be indicated to the master station through the geographic station. If so, the program will flow along the "N" path to a function block 134 to place the request in a queue for later assembly of a location request and transmission to the geographic stations. The program will then flow from the function block 134 to an end function block 136.

If the transfer is to be immediate, the program will flow along a "Y" path from the decision block 132 to a function block 138 wherein data is transferred to the geographic station associated with the responding STU. The program then flows to a decision block 140 to await receipt of an end of transmission from the geographic station. The program will flow along an "N" path back to the input thereof until this EOT is received, at which time it flows along a "Y" path to an "N" block 142.

Referring now to FIG. 10b, there is illustrated a flowchart for the operation wherein the transmission is a non-voice transmission. The program will flow from the decision block 127 to the input of function block 144 to obtain the Customer Coverage Sequence (CCS). The CCS is a sequence of lists for the order in which base stations page/poll a particular customer. For example, the location request could be directed toward data that is a one-way data transmission, such as a FAX or a letter message. The program then flows to a function block 146 when the value of CCS is equal to zero and then to a function block wherein the value of CCS is incremented by one. This indicates the step wherein the first list is retrieved and that customer is polled for locations of the base stations that exist on first list, as indicated by a function block 148. The program then flows to a decision block 149 to await reply. When the reply is received, the program flows along a "Y" path back to the main program at the input of decision block 132, wherein the data is transferred thereafter.

If no reply has been made, the program flows along a "N" path from the decision block 149 to the input of a decision block 151 to determine if the value of CCS is maximum. If not, the program flows back to the input of function block 147 to again increment the value of CCS and then to again transmit location request. However, if the value is max, the program flows along the "Y" path from decision block 151 to the input of a decision block 152 to determine if this was the completion of a retry. If not, the program flows back to the input of function block 146 to again set the value of CCS to 0. However, if this was the completion of a retry, the program flows along a "Y" path to the input of a decision block 154 to determine whether the voice connection should be directed to a voice mailbox. If so, the program flows along the "Y" path to a function block 156 to store the voice message in the mailbox and then to the function block 157 to then go to a paging sequence. When a message is stored in the mailbox, that customer has the option for a page sequence, which will then page that customer once for each selected time interval for a selected number of times. After the paging has been performed a selected number of times, the information sorted in the mailbox is removed.

If the information is not to be stored in a mailbox, the program will flow from the decision block 154 to the input of a function block 158 to terminate the location request. The program then flows to a decision block 159 to determine if a notification is to be provided to the customer. If so, the program flows along a "Y" path wherein notification is sent back to the sender having the associated SIN. However, if no notification is required, the program flows along a "N" path to an end block 162.

The polling operation is generally the process of initiating an RF communication link to a STU as authentication. Authentication in this context means that the RIN has been validated and the SIN is only authenticated when a sender desires to enter the system through the RF link or the COMMON ERROR INTERFACE (CIA) at a base station. Additionally, when a STU is polled, after authentication, when the STU responds back, authentication is an option at the base station.

The way in which polling is achieved is by both geographic cells and office cells. In one mode, polling can be achieved only by geographic cells. In another mode, it can be achieved by both geographic and office cells. In a third mode, the polling can be achieved primarily by the geographic cells and by the office cells on an "as required" basis. In a fourth mode, polling can be achieved by the geographic cells in addition to a CT2 inbound connection, which connection can be either by manual selection or automatic selection. In a fifth mode, polling can be achieved by the geographic cell with the office cell scanned or by providing an assigned cell for this, in accordance with the polling channel information.

Figure 11A:
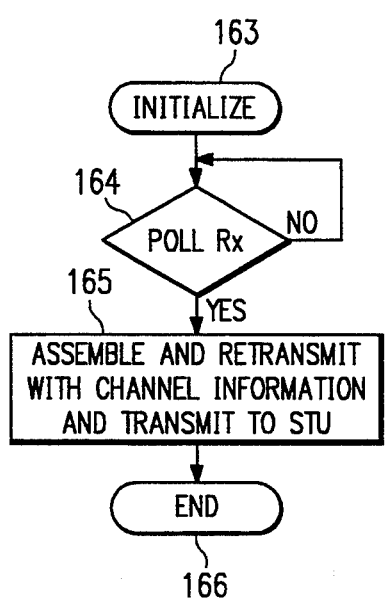
FIGS. 11a and 11b illustrate flowcharts depicting the operation of both the geographic station and the office cell.
Figure 11B:
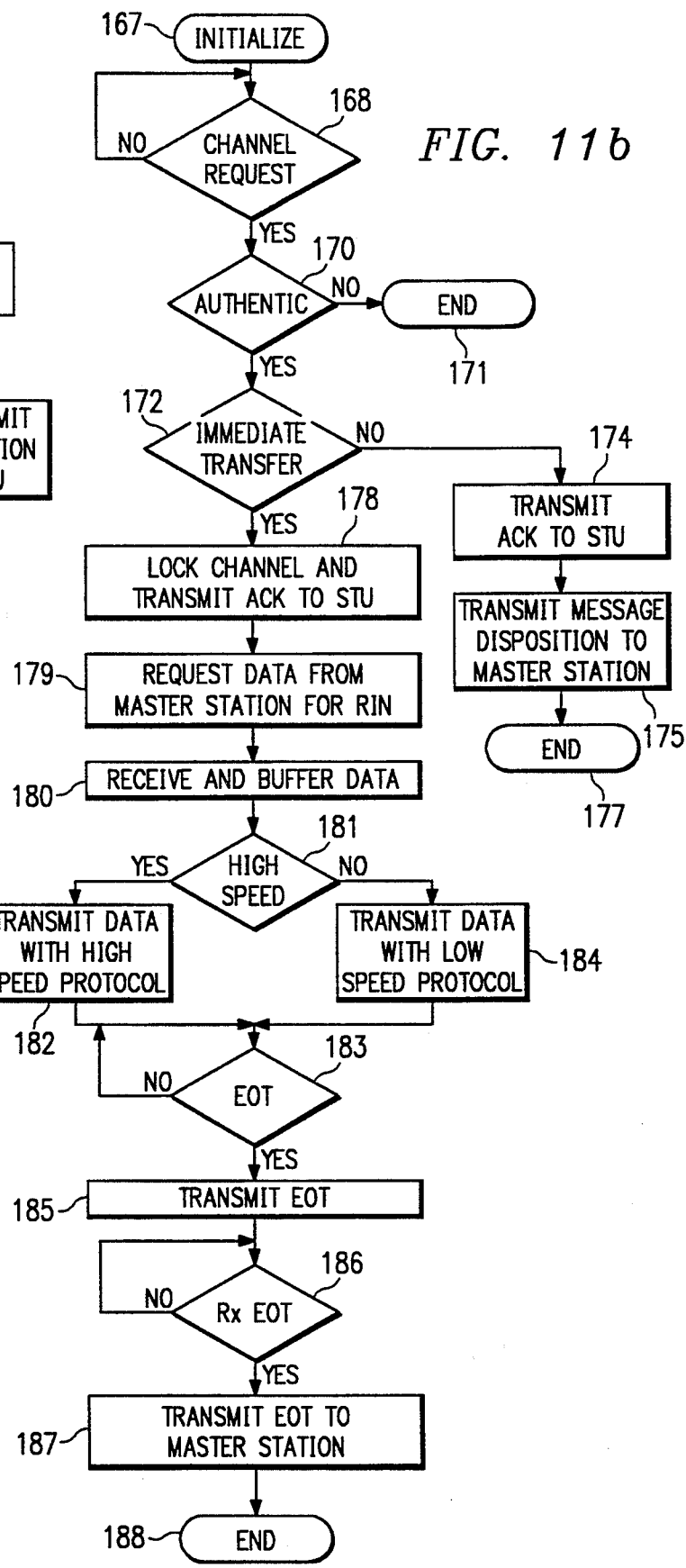

Referring now to FIGS. 11a and 11b, there are illustrated flowcharts depicting the operation of both the geographic station and the office cell or geographic cell only. With reference to FIG. 11a, the flowchart illustrates the generation of the retransmitted polling message to the STUs. The program is initialized in block 163 and then flows to a decision block 164 to determine if the polling message has been received from the master station. If so, the program flows along the "Y" path to a function block 165 to assemble and retransmit the message with the channel information attached thereto. The program then flows to an end block 166.

With reference to FIGS. 11a and 11b, the operation of the geographic station and office cell will be described with respect to the receipt of the location information back from the STU. The program is initiated at an initialize block 167 and then flows to a decision block 168 to await a channel request, which channel request will have associated therewith a Personal Identification Number (PIN). When the channel request is received at a geographic location, the program flows from the decision block 168 along the "Y" path to an authenticate decision block 170. If not authentic, the program flows along an "N" path to an end block 171. If this PIN is not in the data base of that geographic station or office cell, this indicates that this is not a subscriber and, therefore, the phone call cannot be processed. If the message is authentic, i.e., it has the PIN of the STU that is being requested, called RIN, the program flows along a "Y" path from decision block 170 to the a decision block 172 to determine if the message disposition information received back in the channel request requires immediate transfer. If not, the program flows along an "N" path to a function block 174 to transmit an acknowledgement to the STU and then flows to a function block 175 to transmit the message disposition information to the master station, and thereafter to an end block 177. It should be noted that the authentication of SIN and RIN is optional at the master station, but RIN is required. If the channel request is effected at a base station, then authentication of SIN is required to utilize this system, in addition to the destinations required to send a message or connect for full duplex communication.

If an immediate transfer is requested, the program flows from the decision block 172 along the "Y" path thereof to a function block 178 to lock the channel and then transmit an acknowledgement to the STU. The program then flows to a function block 179 to request data from the master station for the associated RIN per the STU PIN. It should be noted that at this point the master station does not concern itself with the of the STU. Rather, the channel and use time is actually affected by the STU itself, by requesting a channel from the geographic station. Once data has been requested, the geographic station then receives and buffers the data, as indicated by function block 180, and then the program flows to a decision block 181 to determine if this is a high data rate channel. If so, the program flows along a "Y" path to a function block 182 to transmit the data with the high data rate protocol and then flows to a decision block 183 to await for an end of transmission signal from the STU. The program will flow along an "N" path back to the input of the decision block 181 until the EOT is received. In high data rate transmission, as described above, data will be transmitted in packets in accordance with modified and extended CT2 protocol. If this data transmission is interactive, then CT-2 full duplex 1:1 mode is used. If this data transmission is to deliver a message, then the duplex is N:1 and using "N" for delivery plus control and command information with the "packet" primarily utilized for the return link error control and flow control signalling.

If low data rate transmission is required, the program will flow from the decision block 181 along the "N" path to the input of a function block 184 to transmit the data with the low data rate protocol. The low data rate can also use the same duplex protocol as stated above, or use one channel for the forward link, one for the return link on an "as required" packet basis, with ARQ over a third channel set aside as the return link control channel, using TDM assignment for the ARQ and acquisition request, or embedding ARQ in the data channel in accordance with the protocol. The program will then flow to the input of the decision block 183.

At the EOT signal, the program will flow along a "Y" path to a decision block 183 to a function block 185 to transmit an EOT signal to the STU and then to a decision block 186 to await the receipt of an EOT from the STU. The program will then flow to a function block 187 to transmit an EOT to the master station and then to an End block 188.

Figure 12A:
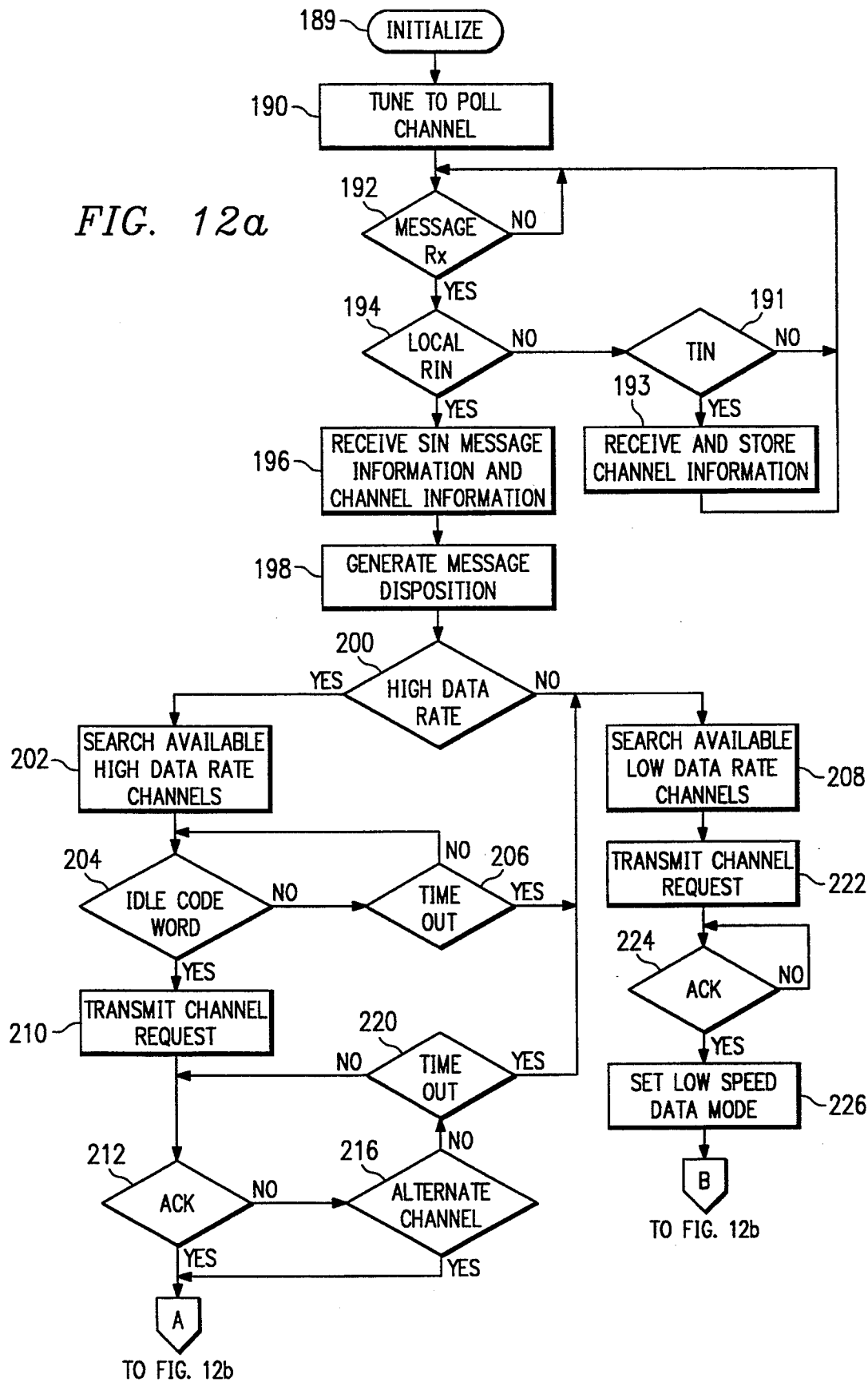
FIG. 12a and 12b illustrates a flowchart depicting the operation of the STU.
Figure 12B:
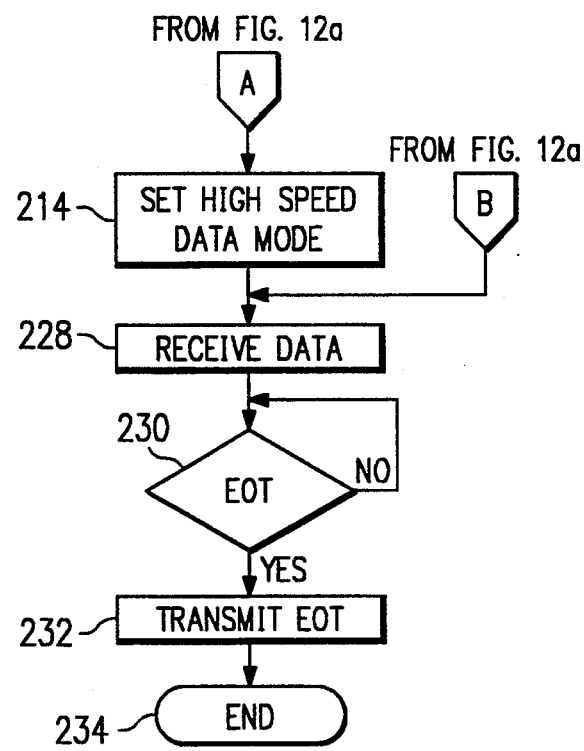

Referring now to FIGS. 12*a* and 12*b*, there are illustrated flowcharts depicting the operation of the STU, which is initiated at an initialize block 189. The program flows to a function block 190 to tune the receiver to the polling channel and then to a decision block 192 to determine if the polling message has been received. If so, the program then flows to a decision block 194 to determine if the RIN in the message is associated with that STU. If the RIN in the message is not associated with that STU, the program flows to a decision block 191 to determine if the Transmitter Identification Number (TIN) has been detected. If it has been detected, the program flows along a "Y" path to a function block 193 to receive and store the channel information and then back to the input of decision block 192. However, if the TIN has not been received, the program flows from decision block 191 along the "N" path back to the input of decision block 192. When the message is received, the program flows from decision block 194 to a function block 196 to receive the SIN and the message information in addition to the channel information from the base station. The message disposition is then generated, as indicated by the function block 198 and then the program flows to a decision block 200 to determine whether the message is to be received over a high data rate channel or a low data rate channel. If it is a high data rate channel, the program flows along a "Y" channel to a function block 202 to search the available high data rate channels. These high data rate channels are the set of channels received from the geographic station that generated the message received by the STU. The program flows to a decision block 204 to determine if an idle code word exists on any of the high data rate channels searched. If not, the program will flow to a time out decision block 206 and back to the input of decision block 204. When a time out has occurred, the program will flow along a "Y" path from decision block 206 to the "N" path, coming from the decision block 200, which indicates the step wherein the STU searches the available low data rate channels, as indicated by a function block 208. However, if an idle code word is detected on the high data rate channel, a channel request is sent to the geographic station, as indicated by a function block 210, and then the program flows to a decision block 212 to wait for an acknowledgement signal. If the acknowledgement signal is received, the program flows to a function block 214 to set the high data rate mode. However, if an acknowledgement is not received, the program would flow along an "N" path from decision block 212 to a decision block 216 to determine if an alternate channel allocation has been transmitted from the geographic station. If so, the STU would then tune to this channel and the program would flow to the input of the function block 214 to set the high data rate mode. However, if an alternate channel had not been received, the program would flow to a timeout decision block 220 which, after a timeout, would flow back to the input of the function block 208.

If the high data rate mode had not been selected, either due to the type of message or due to the fact that the high data rate channel was not available, the program would flow to the input of the function block 208 to search the available low data rate channels. When a channel was found, a channel request would be sent to the geographic station, as indicated by a function block 222 and then to a decision block 224 to wait for an acknowledgement. When the acknowledgement signal is received, the program flows to a function block 226 to set the low data rate mode. The output of function block 226 and 214, indicating the data rate mode for the respective data rate, would both flow to the input of a function block 228 to receive the transmitted data and then into a decision block 230 to determine if an end of transmission had been received from the geographic station. If so, the program would flow to a function block 232 to transmit an EOT signal from the STU to the geographic station and then to an End block 234.

Figure 13:
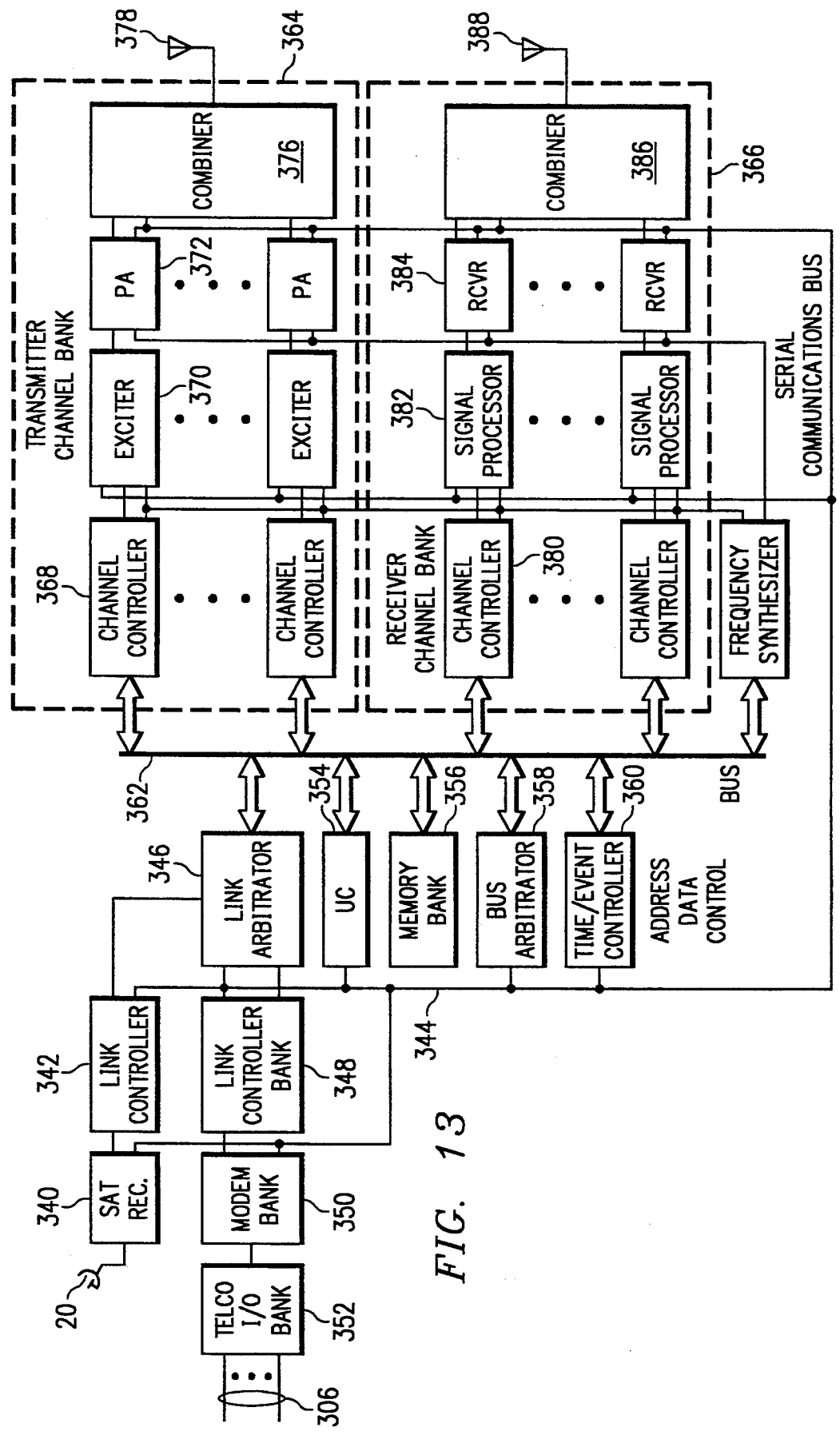
FIG. 13 illustrates a block diagram of the geographic base station.

Referring now to FIG. 13, there is illustrated a functional block diagram of the geographical base station. A satellite receiver 340 is provided that is interfaced with the satellite antennas 20 at each of the base stations. A Link Controller 342 is interfaced with the satellite receiver. The satellite receiver 340 is also interfaced with a general system bus 344. The Link Controller interfaces with a Link Arbitrator 346 to control the overall function of the transmission channels. A Link Controller Bank 348 is connected through a modem bank 350 to a telephone I/O bank 352, which is connected to the telephone lines 106. The system bus is also interface with a microprocessor 356, a bus arbitrator 358 and a time/event controller 360. The other side of each of the Link Arbitrator 346, the microprocessor 356, the bus arbitrator 358 and the time/event controller 360 are interfaced with an internal bus 362 for communicating with a transmitter bank 364 and a receiver bank 366. The transmitter bank is comprised of six channels, each channel comprised of a channel controller 368, an exciter 370 and a power amplifier 372. Each of the channel controllers is operable to interface with the bus 362 and also with the exciter 370, the exciter 370 also interfacing with the serial communications bus 344. The channel controller 368 also interfaces with the serial communication bus 344. The power amplifiers 372 are connected to the output of the exciter 370 and also to the serial communication bus 344. The output of the power amplifiers is connected to the input of a six-input combiner 376, the output of which drives a transmitter antenna 378.

The receiver bank is comprised of six channels, each channel having a channel controller 380, a signal processor 382 and a receiver 384, the channel controller interfacing between the signal processor and the internal bus 362 and the signal processor 382 receiving an input from the receiver 384. Each of the receivers 394 is connected to one of six inputs of a combiner 386. Combiner 386 receives its input from an antenna 388. Each of the receiver channels is described above with respect to FIG. 8, as was each of the channels of the transmitter bank 364.

Figure 14:
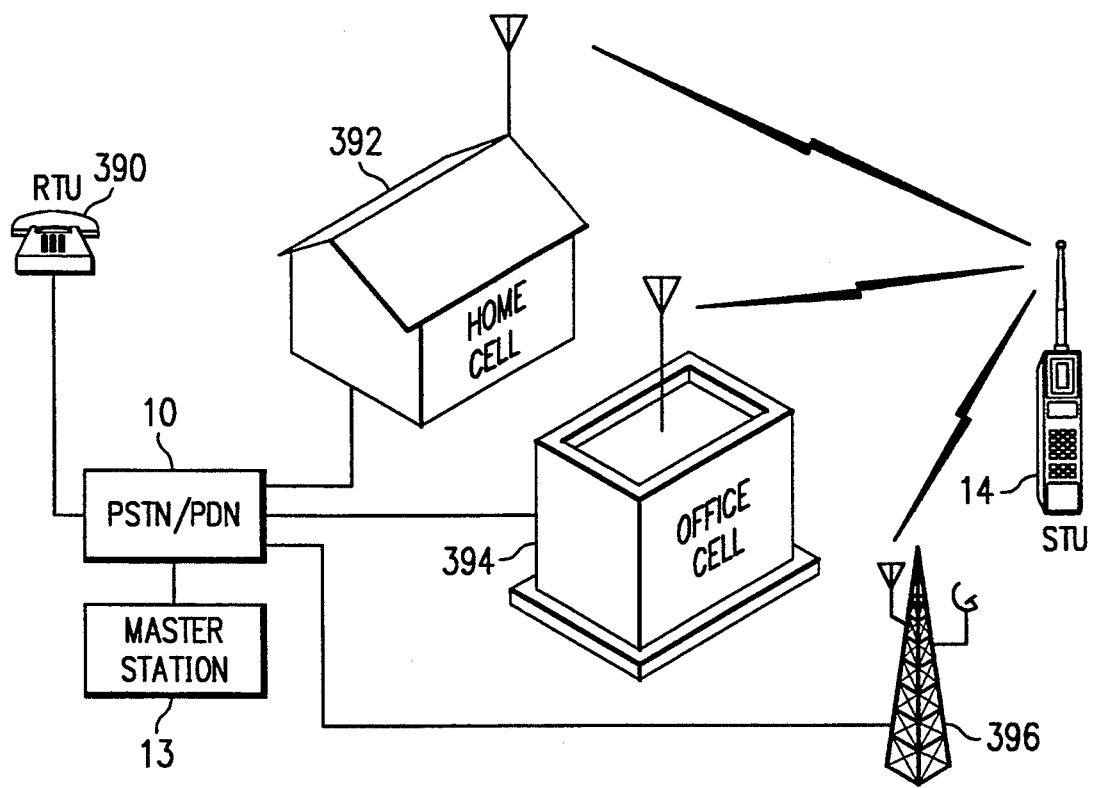
FIG. 14 illustrates a diagrammatic view of the least cost routing operation of the STU.

Referring now to FIG. 14, there is illustrated a diagrammatic view of the STU 14 and the use of least cost routing to provide a two-way connection with a remote telephone unit (RTU) 390. The RTU 390 is operable to interface with the master station 13 through the PSTN/PDN 10. The master station 13 is operable to receive an inbound call from the RTU 390 when it is calling one of the STUs 14 on the network. The master station 13 then makes a decision whether to route the incoming telephone call through a home cell 392, an office cell 394 or a geocell network, illustrated by a stick 396. The home cell 392 is essentially identical to the geocell in that it is a dedicated station having a single channel that can communicate with the STU 14. The home cell 392 operates on the CT1 protocol which is similar to the CT2 protocol with the exception that it is a dedicated system having a single channel for communicating with the STU 14. Typically, this single channel is fairly common with a number of home cells such that they cannot overlap. Therefore, the STU 14 can communicate directly with the home cell 392 such that no charge is involved other than the original line charge. The home cell 392 can always detect whether the STU 14 associated therewith is within its RF range.

The office cell 394 is similar to the home cell 392 with the exception that it can contact a number of STUs 14 in its RF range. The office cell 394 therefore can communicate with a number of STUs 14. However, the office cell 394 is a private system and the only costs involved are the line charges.

When the inbound call is made, the master station 13 first attempts to utilize the home cell, as this is the lowest cost communication link. If the STU 14 is not within the range of the home cell 392, the next route is to attempt to complete the call through the office cell 394. If this is not an available option, the system goes out through the location operation of the geocells, as described above. This system will then locate the STU 14 and determine which stick can be utilized to establish a two-way communication path.

In an outgoing call, the STU 14 is operable to first try and communicate with the home cell 392 to utilize the lowest cost path. If this is not available, the STU 14 will then seek out one channel in the office cell 394. If this is not available, then the STU 14 will attempt to establish a communication link through the geocell system.

Figure 15:
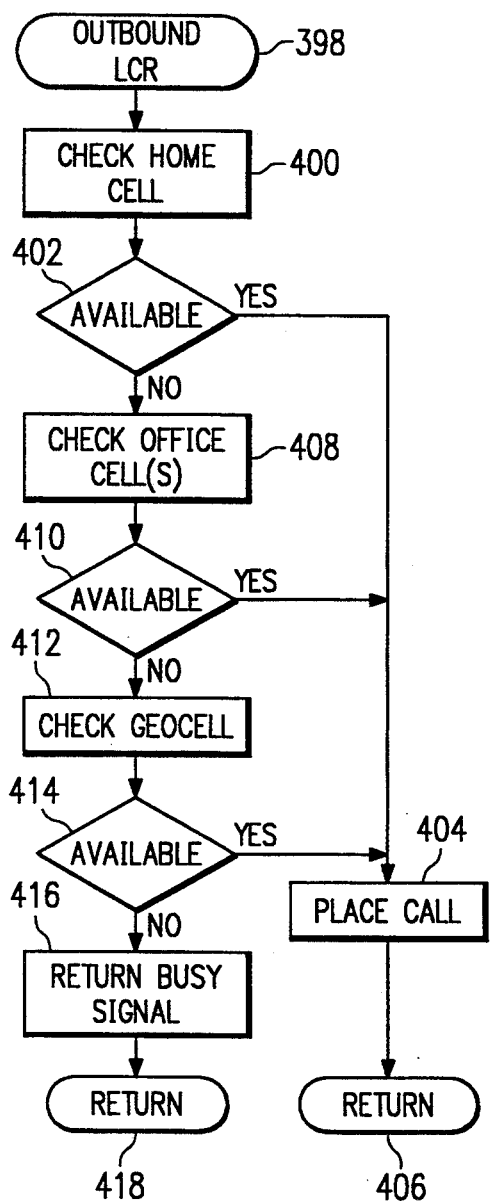
FIG. 15 and 16 illustrate flowcharts for least cost routing.

Referring now to FIG. 15, there is illustrated a flowchart depicting the outbound least cost routing (LCR) procedure. The program is initiated at a start block 398 and then proceeds to a function block 400 to check the home cell and then to a decision block 402 to determine if it is available. If so, the program flows to a block 404 to place the call and then to a return block 406. If not, the program flows to a block 408 to check the office cells, there being the possibility of more than one office cell. The program flows to a decision block 410 to determine if any office cells are available for communication therewith. If so, the program flows to the function block 404 to place the call and, if not, the program flows to a function block 4 12 to check the availability of the geocell in a decision block 414. If it is available, the program flows to function block 404 to place the call and, if not, the program flows to a function block 416 to return a busy signal and then flows to a return block 418.

Figure 16:
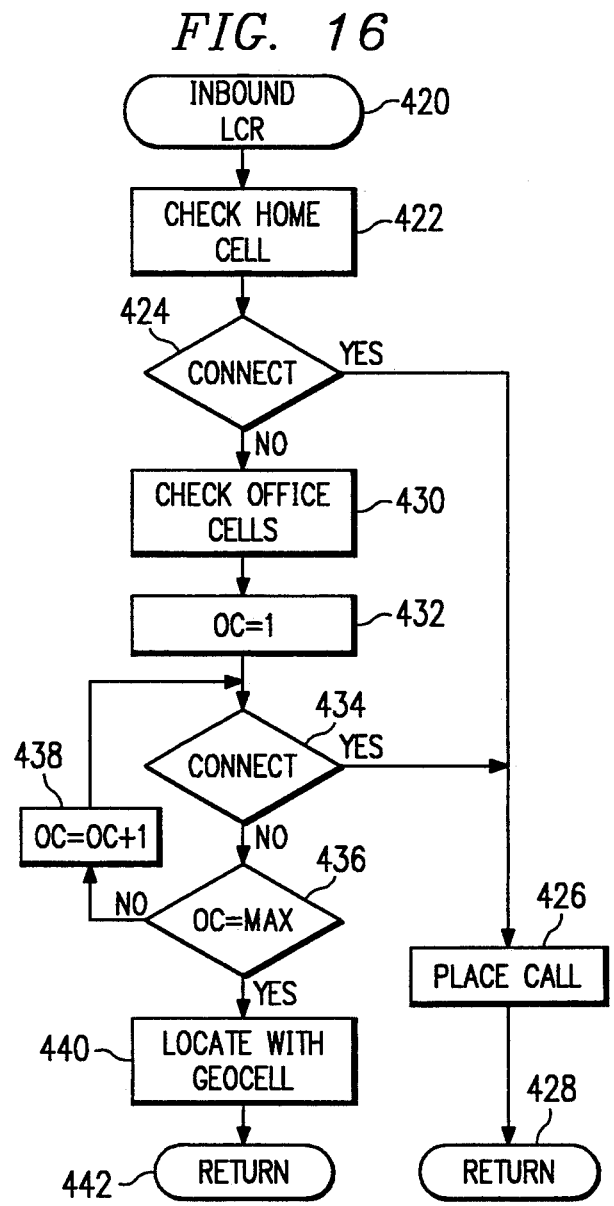

Referring now to FIG. 16, there is illustrated a flowchart depicting the operation of the inbound LCR, which is initiated at a start block 420. The program then flows to a function block 422 to check the availability of the home cell and then to a decision block 424 to determine if a connection has been made. If so, the program flows to a function block 426 to place the call and then to a return block 428. If no connection is made, the program flows from the decision block 424 to a function block 430 to then check the office cells. To check the office cells, an initial value of "1" is set in a function block 432 and then the function block checks the first office cells in the available office cells in the system to determine if a connection is made, as indicated by a decision block 434. If so, the program flows to the function block 426 to place the call. However, if the STU 14 is not associated with that office cell, no connection will be made and the program will then flow to decision block 436 to determine if the value of OC is equal to a maximum value, indicating that all office cells have been checked. If not, the program flows to a function block 438 to increment the value of OC by one and then back to the input of the decision block 434. This continues until all office cells have been checked, at which time the program flows from the decision block 436 to at the input of a function block 440 to locate the STU 14 with the geocell system and then to a return block 442.

In summary, there has been provided a dam communication system for communicating with modified CT2 type remote stations. A message is initially generated at a master station and buffered at the master station. A location request is generated to determine the location of a subscriber telephone unit (STU). This request is simulcast to a plurality of fixed location base stations, which fixed remote stations have associated therewith a plurality of finite channels, the finite channels differing between adjacent ones of the fixed location base stations. Each of the fixed location base stations then simulcasts the message in its defined locale with the addition of information as to what channels are associated with the fixed location base stations. When a STU receives the location request, it responds by transmitting to the fixed location base station from which it received the location request on one of the designated channels. The base station then receives this location request and requests from the master station the data that is designated for this STU. The data is buffered at the base station and then transmitted to the STU.

Although the preferred embodiment has been described in detail, it should be understood that various changes, substitutions and alterations can be made therein without departing from the spirit and scope of the invention as defined by the appended claims.

What is claimed is:

1. A communication system comprising:
   a plurality of fixed location base stations, each having a unique set of RF communication parameters and select ones of said base stations having a common polling channel;
   a non-fixed location communication transceiver having a unique ID number for communicating with said base station on said polling channel and operable to communicate with each of said base stations with the respective unique RF communication parameters;
   the select ones of said base stations operable to generate and output a location request on said polling channel, said location request having associated therewith the unique ID number of said communication transceiver and information relating to the unique RF communication parameters associated with the generating one of said base stations and containing message information regarding the data to be transferred to said communication transceiver;
   said message information including information regarding the length of the message data and the type of message data;
   said communication transceiver operable to receive on said polling channel said location request and to initiate a communication link with one of said base stations in accordance with the received unique RF communication parameters, to allow said communication transceiver to communicate with the one of said base stations, said unique RF communication parameters operable to allow transmission at a high data rate and at a low data rate and said communication transceiver operable to initiate said communication link at a high data rate in accordance with message information in said received location request, indicating that the data can be transmitted over a high data rate communication link; and
   each of said base stations including a memory for storing message data destined to be delivered to said communication transceiver, said base station with which said communication transceiver establishes said communication link operable to transfer said stored message data to said communication transceiver upon establishment of said communication link.

2. The communication system of claim 1 wherein said communication transceiver is operable to transmit over said polling channel to the one of said base stations message disposition information regarding transmission of said stored message data over said communication link.

3. The communication system of claim 1 wherein said communication transceiver is operable to transmit at first and second power levers, said second power level lower than said first power level, said communication transceiver transmitting at said first powder level when transmitting at said low data rate and at said second power level when transmitting at said high data rate.

4. The communication system of claim 1, and further comprising a master station for generating a basic request including the unique ID of said communication transceiver to establish a communication link with said communication transceiver, said master station operable to send said basic request to the select of said base stations, wherein each of said select ones of said base stations combine said basic request with said associated unique RF parameters to generate said location request, the one of said base stations with which said communication transceiver has established said communication link operable to establish a communication link with said master station for allowing information to be transferred from said master station to said communication transceiver through the one of said base stations.

5. The communication system of claim 4, wherein said master station includes a memory and each of said base stations includes a memory, wherein said master station is operable to store data for transfer to said communication transceiver and, when said communication link is established between said communication transceiver and the one of said base stations and between the one of said base stations and said master station, data is transferred from said master station memory to said memory in the one of said base stations for storage thereof and subsequent transfer from the one of said base stations to said communication transceiver.

6. The communication system of claim 1, wherein each of said base station is synchronized to send said location requests at substantially the same time.

7. The communication system of claim 1, wherein said unique RF communication parameters for each of said base stations comprise a group of RF communication channels, each of said groups of RF communication channels being a subset of a master group of communication channels and wherein each of said base stations is operable to transmit over a predetermined RF range such that when said communication transceiver is within the RF range of any of said select ones of said base stations, it will receive location requests from said associated base station, the RF ranges for adjacent ones of said base stations overlapping and said associated group of RF channels being different for overlapping ones of said base stations.

8. The communication system of claim 1, wherein said communication transceiver can only receive over said common RF polling channel.

9. A communication system comprising:
   a plurality of fixed location base stations, each having a unique set of RF communication parameters and select ones of said base stations having a common polling channel;
   a non-fixed location communication transceiver having a unique ID number for communicating with said base stations on said polling channel and operable to communicate with each of said base stations with the respective unique RF communication parameters;
   the select ones of said base stations operable to generate and output a location request on said polling channel, said request having associated therewith the unique ID number of said communication transceiver and information relating to the unique RF communication parameters associated with the generating one of said base stations;
   said communication transceiver operable to receive on said polling channel said location request and to initiate a communication link with one of said base stations in accordance with the received unique RF communication parameters, to allow said communication transceiver to communicate with the one of said base stations; and
   predetermined ones of said fixed location base stations have associated therewith separate fixed location high data rate transmission base stations having unique RF communication parameters that are part of the unique RF communication parameters associated with said associated fixed location base station and said communication transceiver is operable to establish a communication link with said high data rate communication base station associated with the one of said base stations from which said location request was received by said communication transceiver.

10. The communication system of claim 9, wherein each of said base stations includes a memory for storing message data destined to be delivered to said communication transceiver, said base station with which said communication transceiver establishes said communication link operable to transfer said stored message data to said communication transceiver upon establishing of said communication link.

11. The communication system of claim 10, wherein said location request generated by each of said base stations contains message information regarding the data to be transferred to said communication transceiver.

12. The communication system of claim 11, wherein said communication transceiver is operable to transmit over said polling channel to the one of said base stations message disposition information regarding transmission of said stored message data over said communication link.

13. The communication system of claim 9, wherein each of said base stations has an RF range over which a communication link can be established and each of said associated high data rate communication base stations has a separate RF range that is substantially encompassed by the RF range of said associated base station and wherein said communication transceiver is operable to receive said location request from the one of said base stations in whose RF range said communication transceiver is located, wherein said communication transceiver is operable to establish a communication link with said base station in whose RF range said communication transceiver is located when a communication link cannot be established with one of said high data rate base stations due to said communication transceiver not being located in the RF range of one of said high data rate base stations.

14. The communication system of claim 9 wherein said communication transceiver is operable to transmit at first and second power levels, said second power level lower than said first power level, said communication transceiver transmitting at said first power level when transmitting at said low data rate and at said second power level when transmitting at said high data rate.

15. The communication system of claim 9, and further comprising a master station for generating a basic request including the unique ID of said communication transceiver to establish a communication link with said communication transceiver, said master station operable to send said basic request to the select of said base stations, wherein each of said select ones of said base stations combine said basic request with said associated unique RF parameters to generate said location request, the one of said base stations with which said communication transceiver has established said communication link operable to establish a communication link with said master station for allowing information to be transferred from said master station to said communication transceiver through the one of said base stations.

16. A method for establishing a communication link with a non-fixed communication transceiver, comprising
providing a plurality of fixed location base stations, each having a unique set of RF communication parameters, and select ones of the base stations having a common polling channel, the unique RF communication parameters operable to allow transmission at a high data rate and a low data rate;
storing message data at the base stations, which message data is destined to be delivered to the communication transceiver;
generating and outputting from at least one of the select ones of the base stations a location request on the polling channel, the location request having associated therewith a unique ID number of the communication transceiver and information relating to the unique RF communication parameters associated with the generating one of the base stations and containing message information regarding the data to be transferred to the communication transceiver, the message information including information regarding the length of the message data and the type of message data;
receiving at the transceiver on the polling channel the location request;
recognizing at the transceiver the associated unique ID number of the communication transceiver;
initiating a communication link with one of the base stations in accordance with the received unique RF communication parameters, to allow the communication transceiver to communicate with the one of the base stations, the step of initiating the communication link initiating the communication link at a high data rate in accordance with message information in the received location request, indicating that the data can be transmitted over a high data rate communication link; and
transferring the stored message data from the one of the base stations with which the communication transceiver establishes the communication link.

17. The method of claim 16 and further comprising transmitting from the transceiver to the one of the base stations to which the communication link is made message disposition information regarding transmission of the stored message data over the communication link from the one of the base stations.

18. The method of claim 16 wherein the communication receiver is operable to transmit at first and second power levels the second power level lower then the first power level, the step initiating the communication link initiating the communication link at the first power level of the communication transceiver when transmitting at the low data rate and at the second power level when transmitting at the high data rate.

19. The method of claim 16 and further comprising steps of:
providing a master station;
generating a basic request at the master station including the unique ID number of the communication transceiver necessary to establish a communication link with the communication transceiver;
sending the basic request to the select ones of the base stations;
combining the basic request with the associated unique RF parameters at each of the base stations to generate the location request; and establishing a communication link between the one of the base st that has an established communication link with a communication transceiver and the master station for allowing information to be transferred from the master station to the communication transceiver through the one of the base stations.

20. The method of claim 19 and further comprising the steps of:
storing data in the master station for transfer to the communication receiver;
when the communication is established between the communication transceiver and the one of the base stations and between the one of the base stations and the master station, transferring stored data from the master station to the one of the base stations and storing the data at the base station; and
transferring the stored data from the one of the base stations to the communication transceiver.

21. The method of claim 16 wherein the step of generating and outputting the location request from at least one of the select ones of the base stations comprises generating and outputting the location request from substantially all of the select ones at the base stations at substantially the same time.

22. The method of claim 16 wherein the unique RF communication parameters for each of the base stations comprise a group of RF communication channels, each of the groups of RF communication channels being a subset of a master group of communication channels, and wherein each of the base stations is operable to transmit over a predetermined RF range wherein the step of receiving at the communication transceiver on a polling channel the location requests comprises receiving the location request from the one of the base stations in whose RF range the communication transceiver resides, the RF range for adjacent ones of the base stations overlapping and the associated group of RF channels being different for overlapping ones of the base stations.

23. A method for establishing a communication link with a non-fixed location transceiver, comprising:
providing a plurality of fixed location base stations, each having a unique set of RF communication parameters, and select ones of the base stations having a common polling channel;
predetermined ones of the fixed location base stations having associated therewith separate fixed location high data rate transmission base stations having unique RF communication parameters that are part of the unique RF communication parameters associated with the associated fixed location base station;
generating and outputting from at least one of the select ones of the base stations a location request on the polling channel, the location request having associated therewith a unique ID number of the communication transceiver and information relating to the unique RF communication parameters associated with the generating one of the base stations;
receiving at the transceiver on the polling channel the location request;
recognizing at the transceiver the associated unique ID number of the communication transceiver; and
initiating a communication link with one of the base stations in accordance with the received unique RF and communication parameters, to allow the communicating transceiver to communicate with the one of the base stations;
the step of initiating initiating the communication link with the high data rate communication base station associated with the one of the base stations from which the location request was received by the communication transceiver.

24. The method of claim 23 and further comprising storing message data at the base stations, which message data is destined to be delivered to the communication transceiver upon initiation of the communication link; and
transferring the stored message data from the one of the base stations with which the communication transceiver establishes the communication link.

25. The method of claim 23 wherein the message information includes information regarding the length of the message data and the type of message data, the unique RF communication parameters operable to allow transmission at a high data rate and at a low data rate and the step of initiating the communication link comprises initiating the communication link at a high data rate in accordance with message information in the received location request, indicating that the data can be transmitted over a high data rate communication link.

26. The method of claim 23 wherein each of the base stations has an RF range over which a communication link can be established and each of the associated high data rate communication base stations has a separate RF range that is substantially encompassed by the RF range of the associated base station and wherein the step of receiving the location request comprises receiving the location request on the polling channel from the one of the base stations and in whose RF range the communication transceiver is located, and the step of initiating a communication link comprises initiating a communication link with the base station in whose RF range the communication transceiver is located when a communication link cannot be established with one of the high data rate base stations due to the communication transceiver not being located in the RF range of one of the high data rate base stations.

* * * * *

UNITED STATES PATENT AND TRADEMARK OFFICE
CERTIFICATE OF CORRECTION

PATENT NO. : 5,361,399
DATED : November 1, 1994
INVENTOR(S) : Roger D. Linquist, et al.

It is certified that error appears in the above-indentified patent and that said Letters Patent is hereby corrected as shown below:

Column 5, line 53, replace "re-quest" with --request--.

Column 9, line 5, replace "fine" with --line--.

Column 11, lines 65 and 66, replace "Output" with --output--.

Column 20, line 42, replace "dam" with --data--.

Column 21, Claim 3, line 56, replace "levers" with --levels--.

Column 21, Claim 3, line 58, replace "powder" with --power--.

Column 22, Claim 6, line 21, replace "station" with --stations--.

Column 23, Claim 10, line 15, replace "establishing" with --establishment--.

Column 24, Claim 16, line 3, insert --:-- following "comprising".

Column 24, Claim 18, line 51, insert --,-- following "levels".

UNITED STATES PATENT AND TRADEMARK OFFICE
CERTIFICATE OF CORRECTION

Page 2 of 2

PATENT NO. : 5,361,399
DATED : November 1, 1994
INVENTOR(S) : Roger D. Linquist, et al.

It is certified that error appears in the above-indentified patent and that said Letters Patent is hereby corrected as shown below:

Column 24, Claim 18, line 51, replace "then" with --than--.

Column 25, Claim 19, line 2, replace "st" with --stations--.

Column 26, Claim 24, line 19, insert --:-- following "comprising".

Signed and Sealed this

Eighteenth Day of April, 1995

Attest:

BRUCE LEHMAN

Attesting Officer

Commissioner of Patents and Trademarks